United States Patent
Takai et al.

(10) Patent No.: US 7,790,976 B2
(45) Date of Patent: Sep. 7, 2010

(54) CONTENT SEARCHING METHOD, CONTENT LIST SEARCHING METHOD, CONTENT SEARCHING APPARATUS, AND SEARCHING SERVER

(75) Inventors: Motoyuki Takai, Tokyo (JP); Yoichiro Sako, Tokyo (JP); Toshiro Terauchi, Tokyo (JP); Kenichi Makino, Kanagawa (JP); Makoto Inoue, Tokyo (JP); Yasushi Miyajima, Kanagawa (JP); Katsuya Shirai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/390,544

(22) Filed: Mar. 27, 2006

(65) Prior Publication Data

US 2006/0243120 A1 Nov. 2, 2006

(30) Foreign Application Priority Data

Mar. 25, 2005 (JP) ............................ 2005-088328
Feb. 1, 2006 (JP) ............................ 2006-024745

(51) Int. Cl.
  G10H 7/00 (2006.01)
  G06F 17/00 (2006.01)
  A63B 71/00 (2006.01)

(52) U.S. Cl. ........................................... 84/612; 482/8

(58) Field of Classification Search ............ 84/612, 84/465; 482/3, 8, 9
See application file for complete search history.

(56) References Cited

U.S. PATENT DOCUMENTS

| 4,776,323 A * | 10/1988 | Spector ................ 601/23 |
| 2005/0126370 A1 | 6/2005 | Takai et al. |
| 2006/0107822 A1* | 5/2006 | Bowen ................. 84/612 |

FOREIGN PATENT DOCUMENTS

| EP | 1128358 A1 | 2/2000 |
| EP | 1160651 | 12/2001 |
| JP | 2002-282227 | 10/2002 |
| NL | 1023191 | 12/2004 |
| WO | WO 02/05124 A1 | 1/2002 |
| WO | WO 02/093344 A1 | 11/2002 |

* cited by examiner

Primary Examiner—Jeffrey Donels
Assistant Examiner—Andrew R Millikin
(74) Attorney, Agent, or Firm—Wolf, Greenfield & Sacks, P.C.

(57) ABSTRACT

A content searching method includes the steps of: detecting movements of a user as movement information; detecting a movement pattern of the user as key information from the movement information; and searching for a piece of content having a content pattern according to the key information among a plurality of pieces of content.

45 Claims, 25 Drawing Sheets

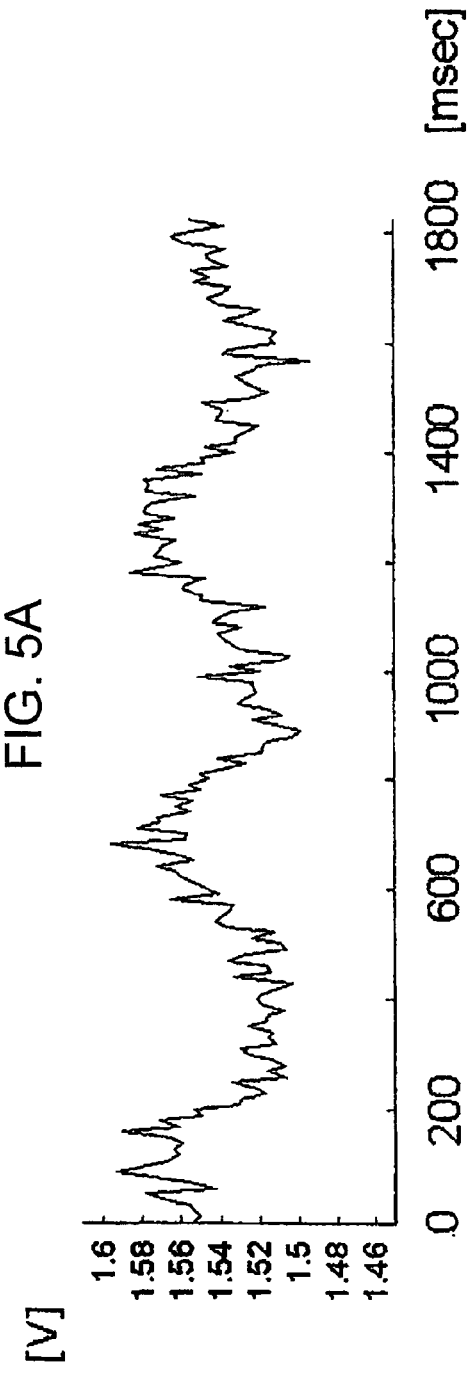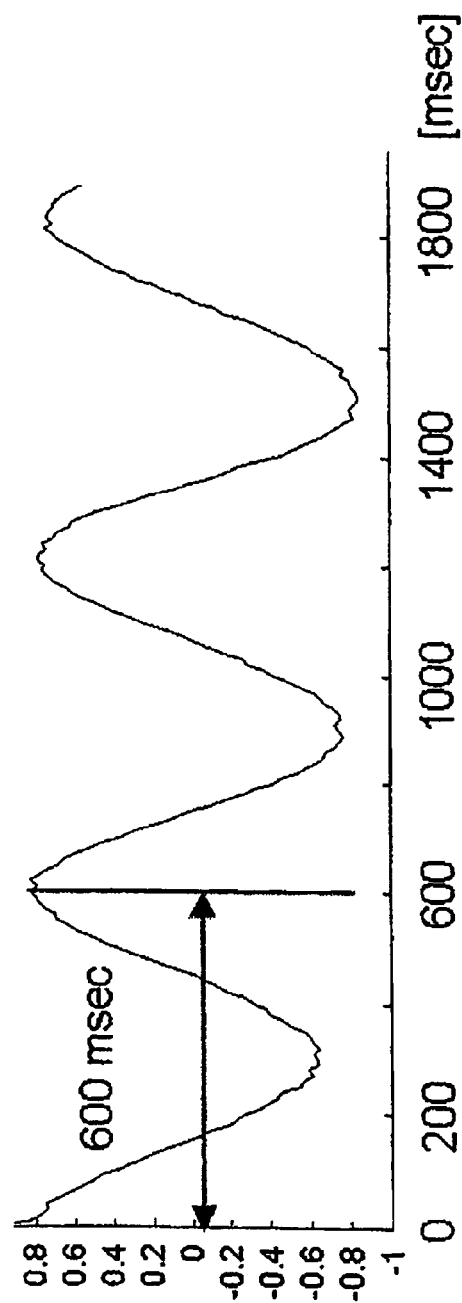

FIG. 6

| ID | Name of artist | Name of song | Name of album | Tempo (i) | Score |
|----|----------------|--------------|---------------|-----------|-------|
| 1 | Orench Punch | Odoru-hana | Pingo-Mango | 140 | 1 |
| 2 | Orench Punch | Asayaket | Pingo-Mango | 92 | 0 |
| 3 | Orench Punch | Oha★rock | Pingo-Mango | 104 | 2 |
| 4 | Orench Punch | Shanghai bunny | Pingo-Mango | 124 | 3 |
| 5 | White Houston | Love | What's yours is mine | 82 | 2 |
| 6 | White Houston | If You told me that | What's yours is mine | 96 | 1 |
| 7 | White Houston | I am you | What's yours is mine | 102 | 4 |
| 8 | White Houston | You get up | What's yours is mine | 126 | 0 |
| 9 | Kenji Tanaka | Tanaken Samba | Tanaken Samba III | 124 | 4 |
| 10 | Kenji Tanaka | Tanaken Mambo | Tanaken Samba III | 96 | 0 |
| 11 | Jork | Paman | Greatest Hits | 112 | 2 |
| 12 | Jork | Dog as a cat | Greatest Hits | 128 | 3 |
| 13 | Jork | Pinch and pinch | Greatest Hits | 98 | 0 |
| 14 | Jork | Nicer | Greatest Hits | 84 | 1 |

FIG. 7

| SCORE CATEGORY | LEVEL (VALUE) | | | | |
|---|---|---|---|---|---|
| | 0 | 1 | 2 | 3 | 4 |
| CATEGORY 1 (USER'S TASTE) | MIN | ... | ... | ... | MAX |
| CATEGORY 2 (THE NUMBER OF PREVIOUS PLAYBACKS) | LARG-EST | ... | ... | ... | SMALL-EST |
| CATEGORY 3 (ELAPSED TIME FROM LAST PLAYBACK) | SHORT-EST | ... | ... | ... | LONG-EST |
| CATEGORY 4 (POPULARITY) | MIN | ... | ... | ... | MAX |

FIG. 9

DIFFERENCE $$D(i) = \left| Tempo(i) - Tek \right| \quad \cdots (1)$$

DIFFERENCE $$D(i) = \left| Tempo(i) - n \times Tek \right| \quad \cdots (2)$$

DIFFERENCE $$D(i) = \left| Tempo(i) - \frac{1}{n} \times Tek \right| \quad \cdots (3)$$

FIG. 12

| ID | NAME OF SONG LIST | CONTENT |
|---|---|---|
| 1 | SLOW SONGS | SONGS WHOSE TEMPO IS UNDER 110 |
| 2 | WALKING SONGS | SONGS WHOSE TEMPO IS 110 OR MORE AND UNDER 150 |
| 3 | JOGGING SONGS | SONGS WHOSE TEMPO IS 150 OR MORE |

FIG. 13

SONG LIST 1 SLOW SONGS

| ID | Name of artist | Name of song | Name of album | Tempo (i) | Score |
|---|---|---|---|---|---|
| 1-1 | Orench Punch | Asayaket | Pingo-Mango | 92 | 0 |
| 1-2 | Orench Punch | Oha★rock | Pingo-Mango | 104 | 2 |
| 1-3 | White Houston | Love | What's yours is mine | 82 | 2 |
| 1-4 | White Houston | If You told me that | What's yours is mine | 96 | 1 |
| 1-5 | White Houston | I am you | What's yours is mine | 102 | 4 |
| 1-6 | Kenji Tanaka | Tanaken Mambo | Tanaken Samba III | 96 | 0 |
| 1-7 | Jork | Pinch and pinch | Greatest Hits | 98 | 0 |
| 1-8 | Jork | Nicer | Greatest Hits | 84 | 1 |

SONG LIST 2 WALKING SONGS

| ID | Name of artist | Name of song | Name of album | Tempo (i) | Score |
|---|---|---|---|---|---|
| 2-1 | Orench Punch | Odoru-hana | Pingo-Mango | 140 | 1 |
| 2-2 | Orench Punch | Shanghai bunny | Pingo-Mango | 124 | 3 |
| 2-3 | White Houston | You get up | What's yours is mine | 126 | 0 |
| 2-4 | Kenji Tanaka | Tanaken Samba III | Tanaken Samba III | 124 | 4 |
| 2-5 | Jork | Parman | Greatest Hits | 112 | 2 |
| 2-6 | Jork | Dog as a cat | Greatest Hits | 128 | 3 |

SONG LIST 3 JOGGING SONGS

| ID | Name of artist | Name of song | Name of album | Tempo (i) | Score |
|---|---|---|---|---|---|
| 3-1 | Orench Punch | Woohah-Woohah | Pingo-Mango | 152 | 2 |
| 3-2 | White Houston | Run, if you want | What's yours is mine | 180 | 1 |
| 3-3 | Kenji Tanaka | Quick Sambas | Tanaken Samba III | 163 | 0 |
| 3-4 | Miyumi Nakajima | Stars in subway | Singles 2005 | 172 | 5 |
| 3-5 | Miyumi Nakajima | Deep sleep | Singles 2005 | 166 | 1 |

FIG. 17
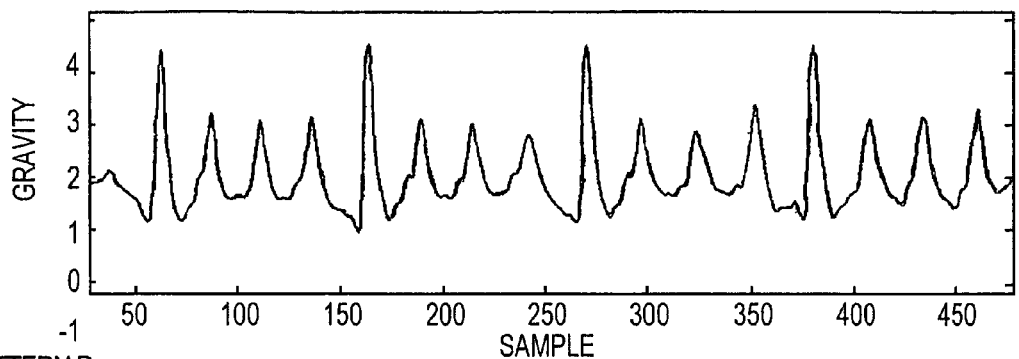
PATTERN A
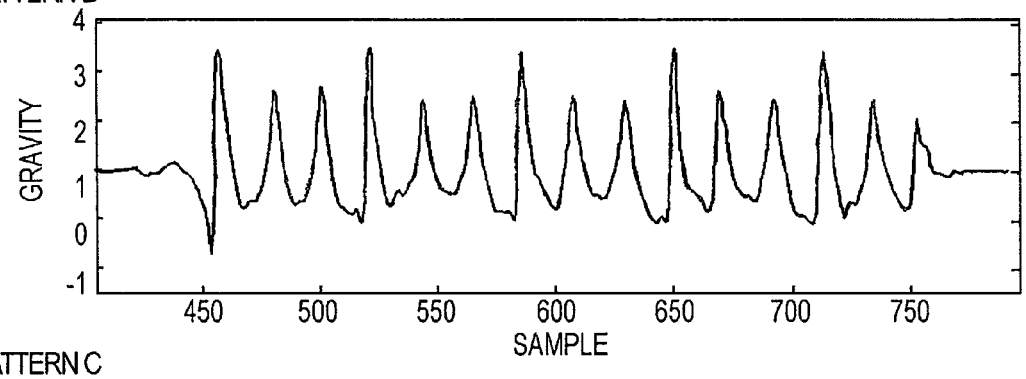
PATTERN B
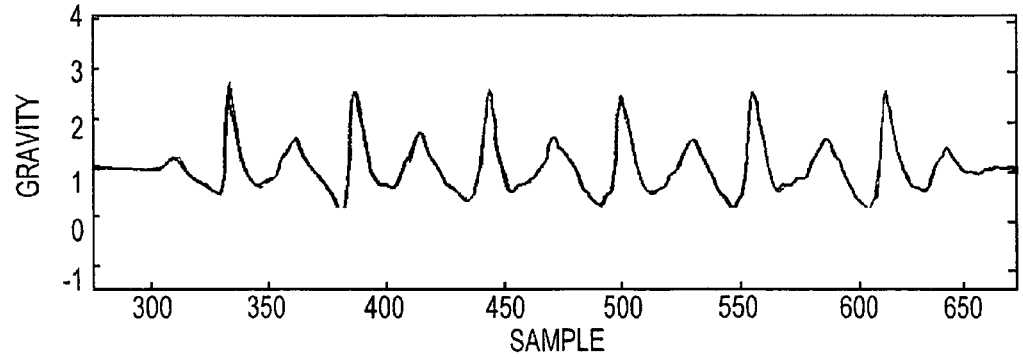
PATTERN C
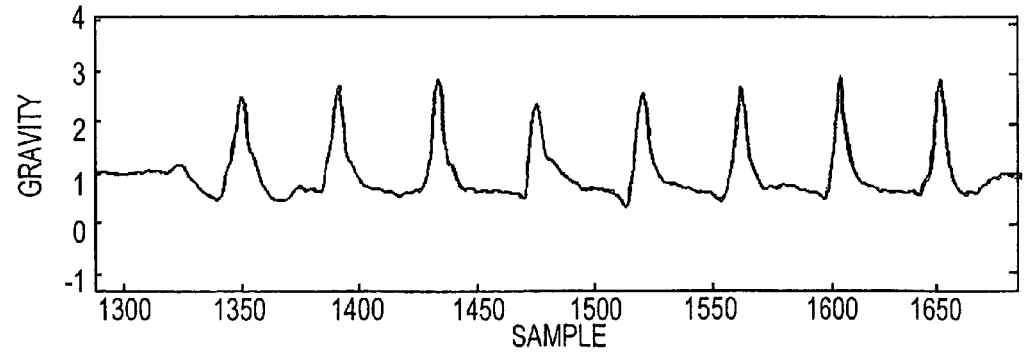
PATTERN D

FIG. 18

| MOVEMENT PATTERN | SONG LIST |
|---|---|
| PATTERN A | SONG LIST 1 |
| PATTERN B | SONG LIST 2 |
| PATTERN C | SONG LIST 3 |
| PATTERN D | SONG LIST 4 |

CONTENT SEARCHING METHOD, CONTENT LIST SEARCHING METHOD, CONTENT SEARCHING APPARATUS, AND SEARCHING SERVER

CROSS REFERENCES TO RELATED APPLICATIONS

The present invention contains subject matter related to Japanese Patent Applications JP 2005-088328 and JP 2006-024745 filed in the Japanese Patent Office on Mar. 25, 2005 and Feb. 1, 2006, respectively, the entire contents of which are incorporated herein by reference.

BACKGROUND OF THE INVENTION

1. Field of the Invention

The present invention relates to a user terminal, such as a music playback apparatus, a mobile phone terminal, an information terminal, or a communication terminal; a searching server accessed by the user terminal through a communication network, such as the Internet or a mobile phone network; and a method for searching for content or a content list used in the user terminal, the searching server, or a searching system including the user terminal and the searching server.

2. Description of the Related Art

Larger capacity and smaller size of storage devices and higher speed of a communication network, such as the Internet, have enabled users to record many songs in a mass storage device, enjoy music anytime and anywhere, and easily access a music server through a network.

Typical methods for selecting an appropriate song from among many songs include a method for specifying the name of a song or the name of an artist and a method for selecting a song from prepared genre or a play list. Also, a method for allowing a music playback apparatus to randomly select a song has been used.

Further, the following methods have been used as a method for selecting a song according to the taste or feeling of a user or a situation.

Patent Document 1 (Japanese Unexamined Patent Application Publication No. 2002-278547) and Patent Document 2 (Japanese Unexamined Patent Application Publication No. 2005-10771) disclose a method for selecting a song that matches an image of a user by receiving a keyword specified by the user.

Patent Document 3 (Japanese Unexamined Patent Application Publication No. 11-120198) discloses a method for selecting a song desired by a user by receiving voice information input by the user.

Patent Document 4 (Japanese Unexamined Patent Application Publication No. 2003-84774) discloses a method for selecting a song in accordance with an average car speed, not with the taste or image of a user.

Other than the method for selecting a song that matches the taste or image of a user, Patent Document 5 (Japanese Unexamined Patent Application Publication No. 2001-299980) discloses a method for changing a tempo of music in accordance with a pulse rate or a movement tempo of a user. Patent Document 6 (Japanese Unexamined Patent Application Publication No. 10-55174) discloses a music playback apparatus in which a music tempo is set in accordance with the swing of a taktstock. Patent Document 7 (Japanese Patent No. 3231482) discloses an automatic accompaniment apparatus in which an accompaniment tempo is set in accordance with a playing speed of a user.

SUMMARY OF THE INVENTION

However, the method for specifying the name of a song or the name of an artist and the method for selecting a song on the basis of genre or a play list are inconvenient for users. On the other hand, in the method for allowing a music playback apparatus to randomly select a song, a song that is not desired by a user may be selected in many cases.

The methods disclosed in Patent Documents 1 to 3 of selecting a song on the apparatus side by receiving a keyword input by a user or by receiving voice information input by a user are also inconvenient for users.

Users often listen to music while doing something, for example, while walking or exercising. In that case, if they need to specify a keyword or input voice information, that disturbs walking or exercise. For example, when a user walks or jogs for 20 to 30 minutes or more, he/she has to specify a keyword or input voice information at intervals of a few minutes, that is, every time a song ends. If he/she does not want to perform such an operation, he/she listens to the same song repeatedly for 20 to 30 minutes or more.

Desirably, a song that matches movements of a user should be searched for and played back while the user is moving so that movements of the user are not disturbed and that intention or desire of the user is satisfied.

Patent Document 5 discloses a method for changing a music tempo in accordance with a movement tempo of a user. In this method, however, selection of a song depends on instructions from a user. In the case where a user walks or jogs for a long time as in the above-described example, the same song is monotonously played back although the tempo thereof is changed, if the user does not provide any instructions.

The present invention provides a method for searching for content or a content list that matches movements of a user with a natural interface without receiving instructions from the user.

A content searching method according to an embodiment of the present invention includes the steps of: detecting movements of a user as movement information; detecting a movement pattern of the user as key information from the movement information; and searching for a piece of content having a content pattern according to the key information among a plurality of pieces of content.

A content list searching method according to an embodiment of the present invention includes the steps of: detecting movements of a user as movement information; detecting a movement pattern of the user as key information from the movement information; and searching for a content list listing pieces of content having a content pattern according to the key information among a plurality content lists.

In the above-described content searching method, a movement pattern of a user, such as a movement tempo or a movement rhythm, is detected from movement information indicating movements of the user. Then, a piece of content having a content pattern according to the detected movement pattern, for example, a song having a song tempo suitable for the detected movement tempo or a song having a song rhythm suitable for the detected movement rhythm, is directly searched for.

In the above-described content list searching method, a movement pattern of a user, such as a movement tempo or a movement rhythm, is detected from movement information indicating movements of the user. Then, a content list listing pieces of content having a content pattern according to the detected movement pattern, for example, a song list listing songs having a song tempo suitable for the detected movement tempo or a song list listing songs having a song rhythm suitable for the detected movement rhythm, is searched for.

According to the present invention, content or a content list suitable for movements of a user can be searched for with a natural interface without receiving instructions from the user.

BRIEF DESCRIPTION OF THE DRAWINGS

FIG. 2 shows a functional configuration of the user terminal shown in FIG. 1 when a song is searched for;

FIG. 3 shows a functional configuration of the user terminal shown in FIG. 1 when a song list is searched for;

FIG. 5A shows an example of a sensor output signal and FIG. 5B shows an example of an autocorrelation waveform;

FIG. 6 shows an example of song appendix information stored in a content database;

FIG. 7 shows an example of score used for search;

FIG. 9 shows examples of expressions to calculate a difference used for search;

FIG. 12 shows an example of song lists stored in the content database;

FIG. 13 shows specific examples of song lists;

FIG. 17 shows an example of representative rhythm patterns;

FIG. 18 shows an example of correspondence between movement patterns and song lists to be searched for in rhythm-based search for a song list;

DESCRIPTION OF THE PREFERRED EMBODIMENTS

1. First Embodiment: FIGS. 1 to 18

As a first embodiment, description is given below about a user terminal (a song searching apparatus or a song list searching apparatus) and a song searching method or a song list searching method in the case where content includes songs and where a song or a song list is searched for in the user terminal.

Figure 1:
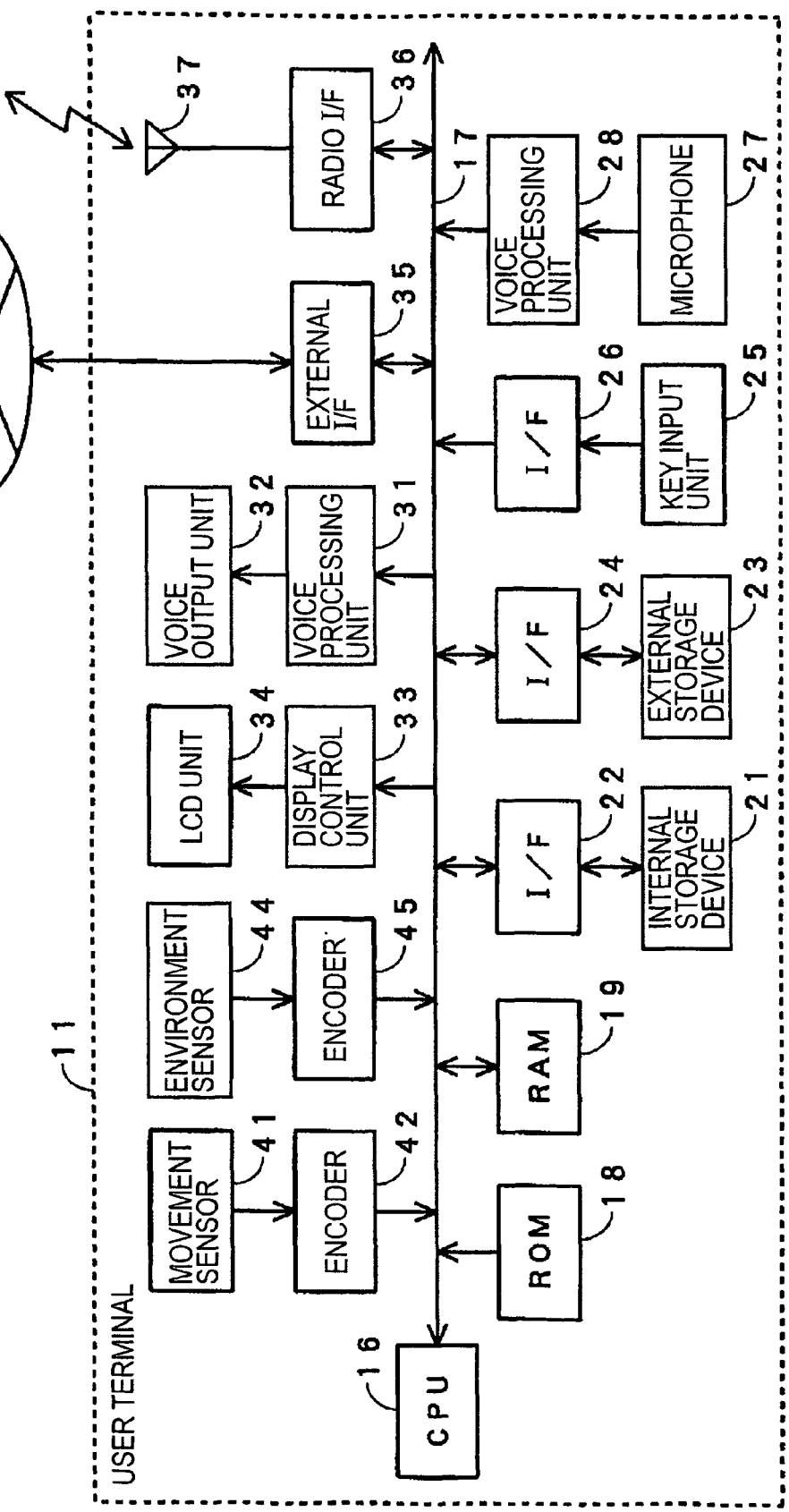
FIG. 1 shows a configuration of an example of a user terminal according to a first embodiment of the present invention.

(1-1. Configuration of User Terminal: FIG. 1)

FIG. 1 shows an example of a configuration of a user terminal according to this embodiment.

The user terminal 11 functions as a portable or stationary music recording/playback apparatus or a mobile phone terminal and includes a CPU (central processing unit) 16 and a bus 17. The bus 17 connects to a ROM (read only memory) 18 on which various programs and data are written and a RAM (random access memory) 19 on which the programs and data are expanded.

Also, the bus 17 connects to an internal storage device 21 via an interface 22 and an external storage device 23 via an interface 24. The internal storage device 21 is a hard disk or a semiconductor memory incorporated in the user terminal 11, whereas the external storage device 23 is a removable storage device such as a CD or a memory card. On the internal storage device 21 or the external storage device 23, data of many songs, appendix information thereof, and a plurality of song lists are recorded.

Further, the bus 17 connects to a key input unit 25 via an interface 26, a microphone 27 via a voice processing unit 28, a voice output unit 32 via a voice processing unit 31, and a liquid crystal display (LCD) unit 34 via a display control unit 33.

The voice processing unit 28 converts analog voice signals from the microphone 27 to digital voice data and compresses the data as necessary. The voice processing unit 31 decompresses digital voice data output to the bus 17 if it is compressed and converts the digital voice data to analog voice signals. The voice output unit 32 is a speaker or a headphone.

Further, the bus 17 connects to an external interface 35 used to access the Internet 100 and also connects to an antenna 37 via a radio interface 36. Note that, when a song or a song list is searched for in the user terminal 11 as in the first embodiment, the external interface 35, the radio interface 36, and the antenna 37 are unnecessary.

Also, the bus 17 connects to a movement sensor 41 via an encoder 42 and an environment sensor 44 via an encoder 45.

The movement sensor 41 detects movements of a user as movement information. The movement sensor 41 may be a device capable of eventually detecting a movement pattern of a user, such as a movement tempo or a movement rhythm, from movement information output. For example, a device to detect a biological condition of a user, such as a heart rate and a myoelectric potential, may be used. Desirably, the movement sensor 41 should be capable of directly detecting physical movements of a user, such as movements of feet and hands, shake of a head, swing of arms, and up-and-down or side-to-side movements of a body. Specifically, an acceleration sensor or a video camera is used, as described below.

In the case where a user exercises by using a fitness machine, for example, where a user runs on a treadmill, the movements of the machine can be detected as movements of the user.

The encoder 42 converts movement information output from the movement sensor 41 to a digital signal if the information is an analog signal, processes and analyzes the digital signal, and detects a movement pattern of the user, such as a movement tempo or a movement rhythm, as key information.

The environment sensor 44 detects environment information, such as the date/time, temperature, position, and so on at a predetermined timing. The encoder 45 converts the environment information output from the environment sensor 44 to a digital signal if the information is an analog signal, processes and analyzes the digital signal, and detects the environment of a predetermined situation at the time by classifying it into a season, day or night, cold or warm, indoor or outdoor, and a location such as seaside or piedmont.

The environment sensor 44 and the encoder 45 are not always necessary. However, providing these devices enables an auxiliary use of a difference in environments in search for a song or a song list, as described below.

As described below, in the case where detected key information is registered and the registered key information is called in order to search for a song or a song list, key information corresponding to an environment at a predetermined situation can be called by providing an environment detecting unit including the environment sensor 44 and the encoder 45, without a need of specification by the user.

Figure 2:
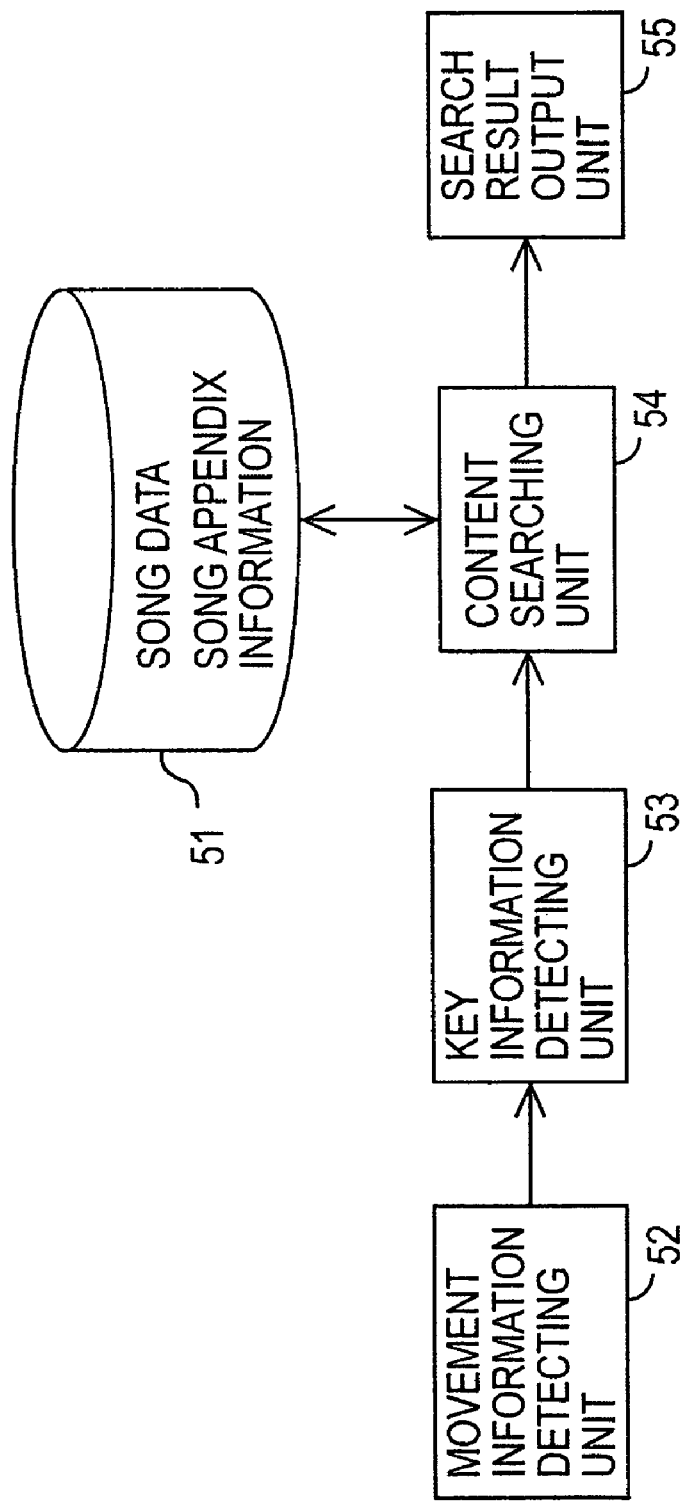
Figure 3:
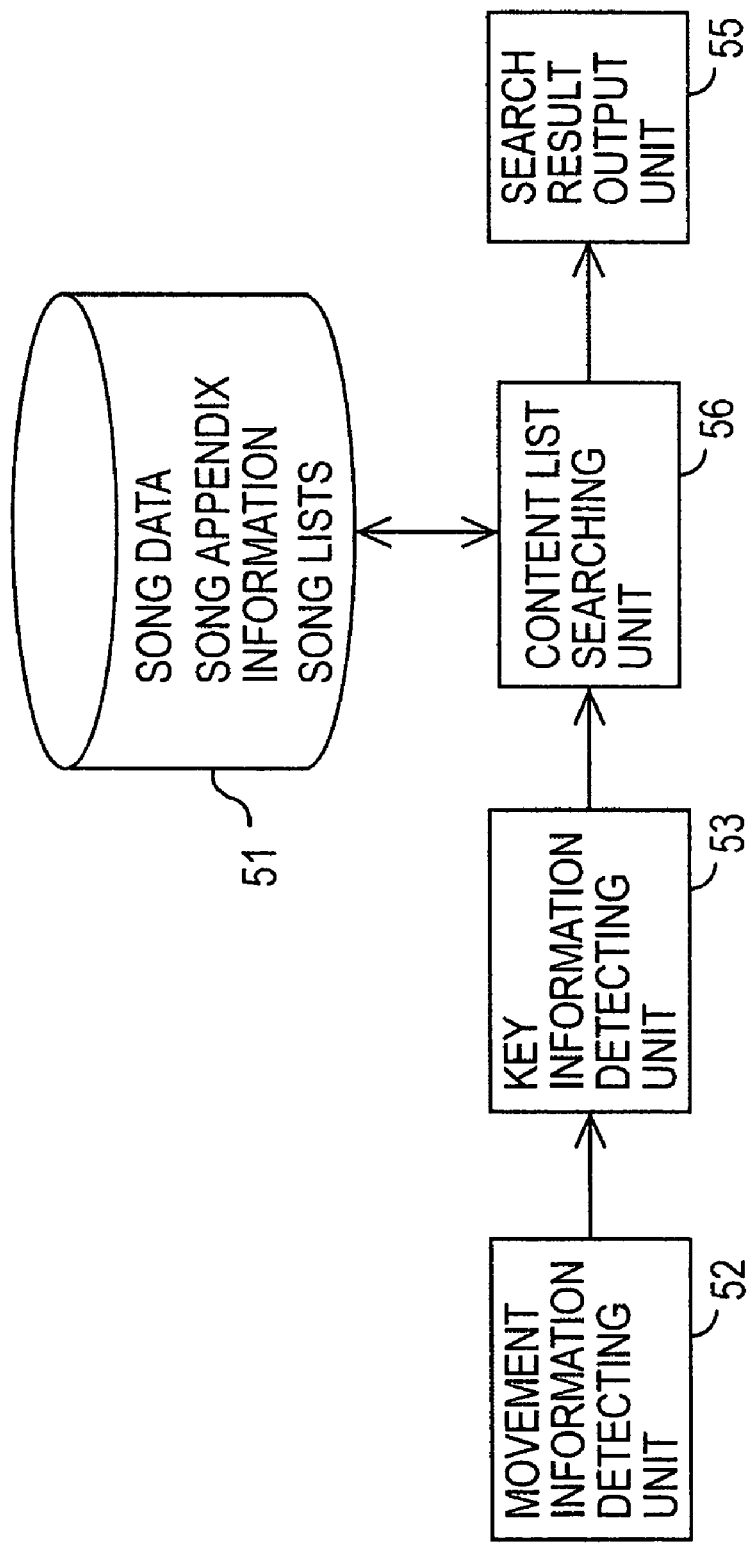

(1-2. Functional Configuration of User Terminal: FIGS. 2 and 3)

<1-2-1. Search for a Song: FIG. 2>

As shown in FIG. 2, the user terminal 11 shown in FIG. 1 functionally includes a content database 51, a movement information detecting unit 52, a key information detecting unit 53, a content searching unit 54, and a search result output unit 55 in the case where a song is searched for.

The content database 51 corresponds to the internal storage device 21 or the external storage device 23 shown in FIG. 1 and stores/holds data of many songs and song appendix information.

The movement information detecting unit 52 corresponds to the movement sensor 41 and the CPU 16 shown in FIG. 1 and detects movements of a user as movement information.

The key information detecting unit 53 corresponds to the encoder 42 and the CPU 16 shown in FIG. 1 and detects a movement pattern of a user as key information by processing and analyzing movement information obtained by the movement information detecting unit 52.

The content searching unit 54 corresponds to the CPU 16, the ROM 18, and the RAM 19 shown in FIG. 1 and searches the content database 51 storing many songs for a song having a song pattern suitable for a movement pattern of a user at a predetermined time on the basis of key information obtained by the key information detecting unit 53.

The search result output unit 55 corresponds to the voice processing unit 31, the voice output unit 32, and the CPU 16 shown in FIG. 1 and plays back the song found by the content searching unit 54 by using the song data recorded in the content database 51.

Note that, as described below, the found song need not always be played back in real time. In that case, for example, the artist and name of the song found by the content searching unit 54 are displayed in the LCD unit 34 shown in FIG. 1 on the basis of the song appendix information recorded in the content database 51. The display control unit 33, the LCD unit 34, and the CPU 16 shown in FIG. 1 function as the search result output unit 55.

<1-2-2. Search for a Song List: FIG. 3>

As shown in FIG. 3, the user terminal 11 shown in FIG. 1 functionally includes the content database 51, the movement information detecting unit 52, the key information detecting unit 53, a content list searching unit 56, and the search result output unit 55 in the case where a song list is searched for.

The content database 51 corresponds to the internal storage device 21 or the external storage device 23 shown in FIG. 1. In this case, the content database 51 stores/holds a plurality of song lists (described below) in addition to the data of many songs and the song appendix information.

The functions of the movement information detecting unit 52 and the key information detecting unit 53 are the same as those in the case of searching for a song shown in FIG. 2.

The content list searching unit 56 corresponds to the CPU 16, the ROM 18, and the RAM 19 shown in FIG. 1 and searches the content database 51 storing a plurality of song lists for a song list listing songs having a song pattern suitable for a movement pattern of a user at a predetermined time on the basis of key information obtained by the key information detecting unit 53.

The search result output unit 55 selects a song from the found song list as necessary in the method described below, and then plays back the selected song by using the song data recorded in the content database 51 or displays the artists and names of the songs listed in the found list in the LCD unit 34 shown in FIG. 1 by using the song appendix information recorded in the content database 51. The CPU 16, the voice processing unit 31, the voice output unit 32, the display control unit 33, and the LCD unit 34 shown in FIG. 1 function as the search result output unit 55.

Figure 4:
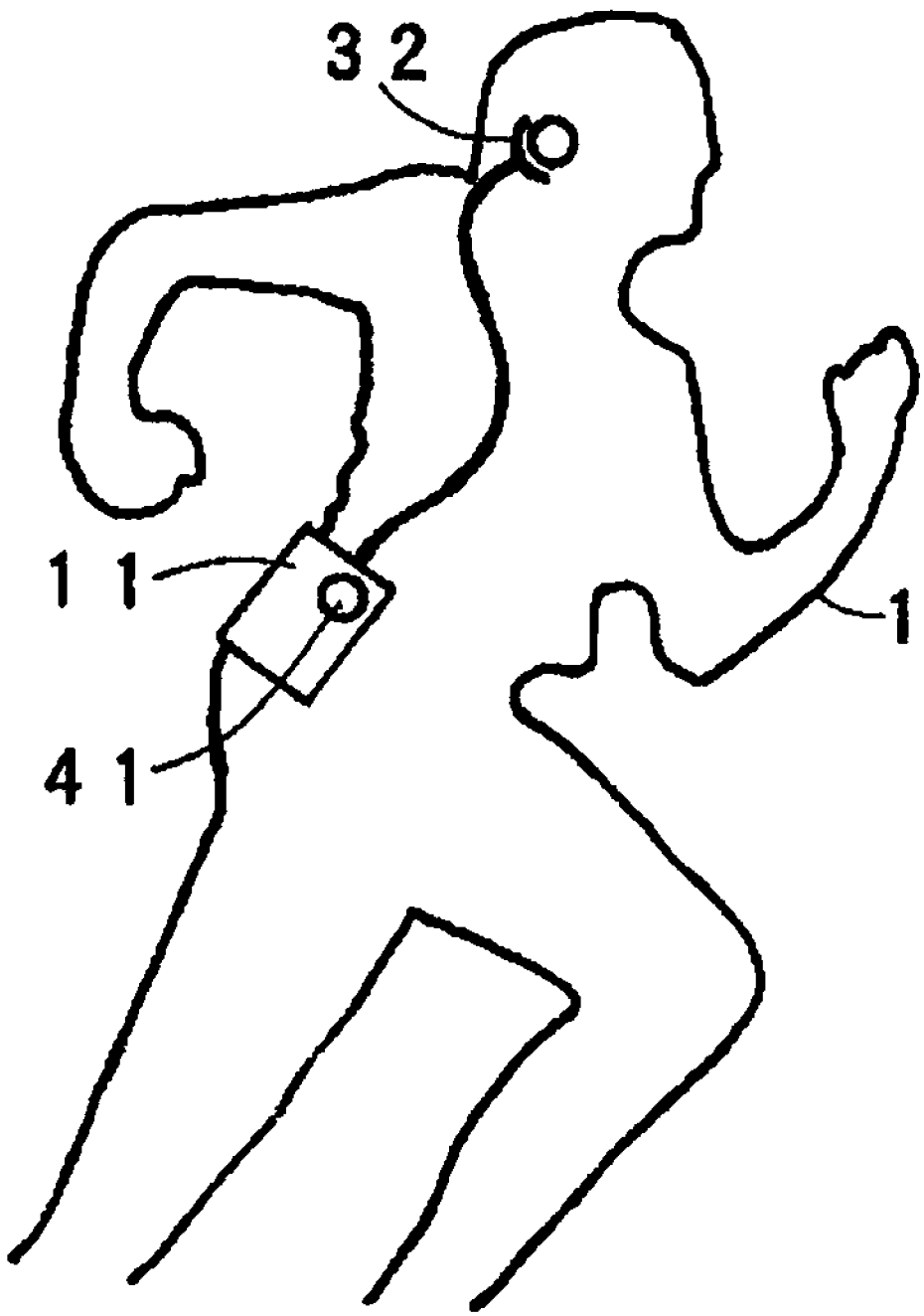
FIG. 4 shows an example of a walking state.

(1-3. Movement Information and Key Information: FIG. 4 and FIGS. 5A and 5B)

In the case where a user 1 allows the user terminal 11 to search for a song or a song list while walking outdoors, the user 1 carries the user terminal 11, in which the movement sensor 41 is incorporated or to which the movement sensor 41 is attached or connected, by hanging it on the waist or tying it around an arm, as shown in FIG. 4. Under this condition, a song found or selected is played back. When the user 1 wants to listen to the song, he/she puts a headphone as the voice output unit 32 on his/her head.

In this case, an acceleration sensor, a strain gauge, or a pressure sensor is used as the movement sensor 41. The movement sensor 41 detects a walking status of the user 1 on the basis of up-and-down movements of the body, movements of the feet, and swing of the arms of the walking user 1.

Accordingly, while the user 1 is walking, movement information output from the movement sensor 41 can be obtained. An example of the obtained information is shown in FIG. 5A, which is a graph showing a sensor output signal. As can be seen in this graph, a voltage V inches in a short time but periodically changes in whole.

That is, in this case, one period corresponds to a period from when the user 1 steps his/her left foot (on the ground) to when the user 1 steps his/her right foot (on the ground) or a period from when the user 1 steps his/her right foot to when the user 1 steps his/her left foot.

The walking period indicates a walking tempo. The walking tempo is fast when the walking period is short, and the walking tempo is slow when the walking period is long. Herein, "walking" includes "running".

When a song having a song tempo according to a movement tempo of a user is to be searched for (hereinafter this search is called "tempo-based search for a song"), or when a song list listing songs having a song tempo according to a movement tempo of a user is to be searched for (hereinafter this search is called "tempo-based search for a song list"), the key information detecting unit 53 shown in FIGS. 2 or 3 detects a walking tempo as key information.

As a detecting method, a method of obtaining an autocorrelation function of the sensor output signal shown in FIG. 5A can be used. If the sensor output signal has the voltage shown in FIG. 5A, the autocorrelation waveform thereof is that shown in FIG. 5B. On the basis of the autocorrelation waveform, a walking period, that is, a walking tempo (movement tempo) can be detected.

For example, if the walking period is 600 msec, one step corresponds to 600 msec and thus 100 steps are taken in one minute. This walking period corresponds to a song tempo (music tempo) of 100 in a crotchet. In the example shown in FIGS. 5A and 5B, the walking tempo is 100 (100 steps per minute). In this case, information (value) indicating that a movement tempo is 100 can be obtained as key information (key value).

When a user exercises indoors, a video camera can be used as the movement sensor 41 (movement information detecting unit 52). In this case, the movement tempo of the user can be detected as key information (key value) by processing and analyzing video data obtained from the video camera in a method of image recognition or pattern recognition by using the encoder 42 (key information detecting unit 53).

Also, key buttons of a mobile phone terminal or a keyboard of a personal computer can be used as the movement sensor 41. In that case, the encoder 42 (key information detecting unit 53) processes and analyzes a signal (movement information) obtained through pressing of the key button or tapping on the keyboard, so that a key-button pressing tempo or a keyboard tapping tempo can be detected as a movement tempo of the user.

Also, a microphone can be used as the movement sensor 41. In that case, sound generated when the key buttons are pressed or the keyboard is tapped is picked up by the microphone, and voice signals obtained from the microphone are captured as movement information.

According to an application, a movement rhythm of a user is detected, and a song having a song rhythm according to the movement rhythm is searched for or a song list listing songs having a song rhythm according to the movement rhythm is searched for (hereinafter this search is called "rhythm-based search for a song or a song list). The details thereof are described below.

(1-4. Song Appendix Information: FIGS. 6 and 7)

FIG. 6 shows an example of song appendix information of each song recorded in the content database 51. ID information (number) uniquely identifies each song in a song searching system or a song list searching system, that is, in the user terminal 11 in the first embodiment. The song appendix information, including the name of an artist, the name of a song, the name of an album, tempo(i), and score, is written for each ID number.

Tempo(i) indicates a tempo of a corresponding song. In FIG. 6, the minimum is 82 of the song of ID(i)=5, whereas the maximum is 140 of the song of ID(i)=1.

In tempo-based search for a song, the "Tempo(i)" is used to search for a song. On the other hand, in tempo-based search for a song list, songs whose Tempo(i) is within a predetermined range are listed in each song list.

Score is determined on the basis of any of categories 1 to 3 shown in FIG. 7 when a song or a song list is searched for in the user terminal 11 as in the first embodiment.

Category 1 is user's taste for a corresponding song. When a user records a song in the content database 51 or at an appropriate time thereafter, the user sets any of levels (values) 0, 1, 2, 3, and 4 and associates the level with the song. Level 0 is set for a least favorite song, whereas level 4 is set for a most favorite song.

Category 2 is the number of previous playbacks of a corresponding song. The level is set and is rewritten by the CPU 16 of the user terminal 11. For example, as described below, level 0 indicates the largest number of playbacks and level 4 indicates the smallest number of playbacks so that songs in which the number of previous playbacks is small are preferentially searched for or selected. However, the opposite can also be applied. That is, level 0 indicates the smallest number of playbacks and level 4 indicates the largest number of playbacks so that songs in which the number of previous playbacks is large are preferentially searched for or selected.

Category 3 is elapsed time from when a corresponding song was played back last time. The level is set and rewritten by the CPU 16 of the user terminal 11. Level 0 indicates that the elapsed time is the shortest and level 4 indicates that the elapsed time is the longest.

When the song searching system or the song list searching system is configured as a network system as in the following second or third embodiment, category 4 shown in FIG. 7 is provided. Category 4 is popularity of a corresponding song among users on a network.

(1-5. Tempo-Based Search for a Song: FIGS. 8 to 11)

Figure 8:
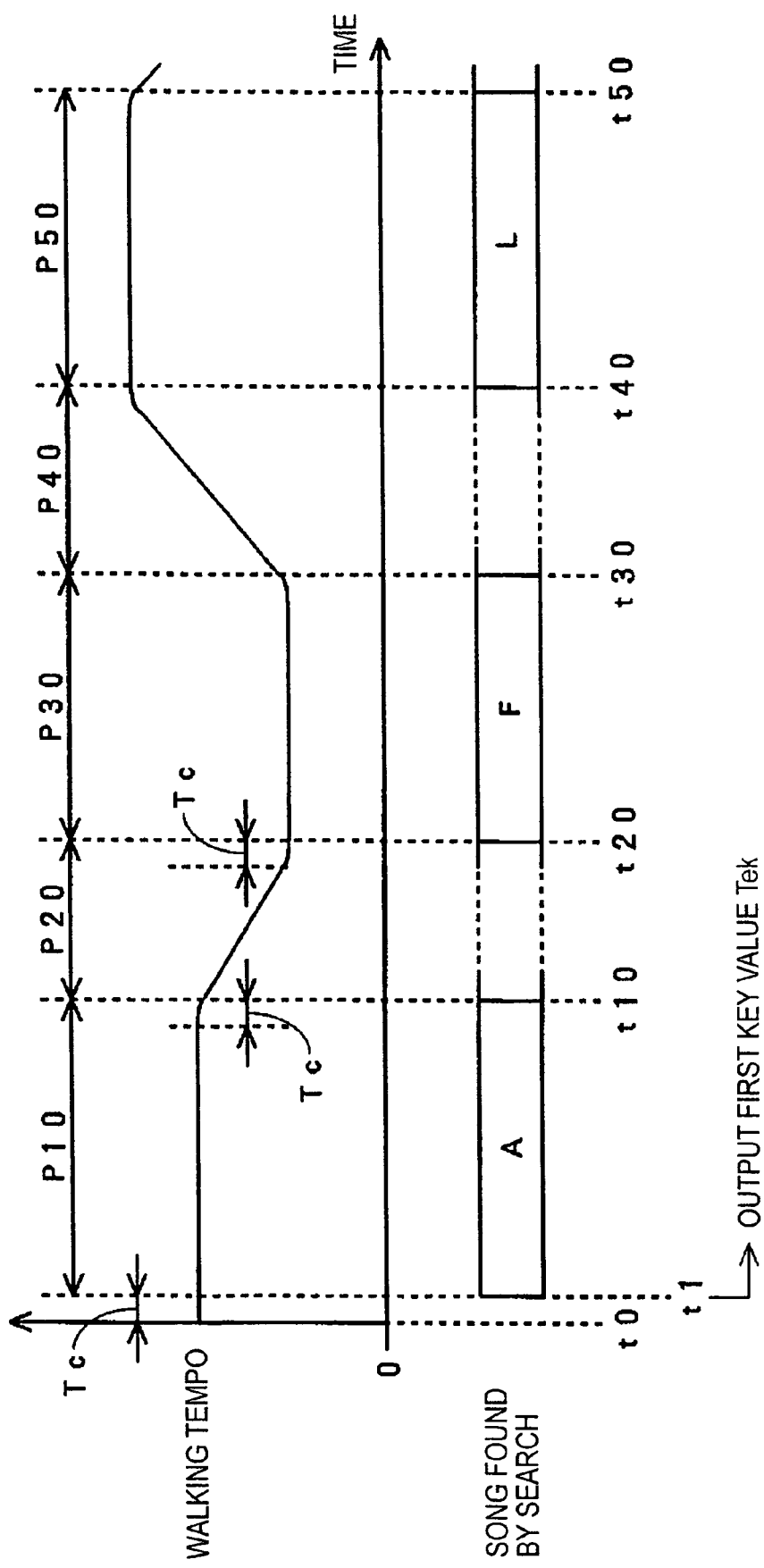
FIG. 8 shows an example of a state where different songs are found by search in accordance with change in walking tempo.

FIG. 8 shows an example of tempo-based search for a song. Specifically, FIG. 8 shows an example of change in a walking tempo in the case where a song having a song tempo according to a walking tempo of a user is searched for.

In this example, the user provides instructions to the user terminal 11 to search for and play back a song and starts walking at time t0. Then, the user walks fast at a steady tempo during a period from time t0 to time t1 and period P10 from time t1 to time t10, gradually decreases the walking tempo during period P20 from time t10 to time t20, walks slowly at a steady tempo during period P30 from time t20 to time t30, gradually increases the walking tempo during period P40 from time t30 to time t40, and walks faster than in period P10 at a steady tempo during period P50 from time t40 to time t50.

The content searching unit 54 shown in FIG. 2 captures a key value (key information) detected as a walking tempo (movement tempo) from the key information detecting unit 53, with preset time period Tc being a search period.

Time period Tc is two seconds, for example. Thus, when the walking period is about 600 msec (walking tempo is 100) as in FIGS. 5A and 5B, the search period is more than three times as long as the walking period, so that the walking period (walking tempo) can be detected a plurality of times in the search period. However, the key information detecting unit 53 outputs an average of walking-tempo values detected in the plurality of times or the walking-tempo value detected at the last time as a key value Tek of a walking tempo detection result. In the example shown in FIG. 8, the first key value Tek is output at time t1 after time period Tc has elapsed from time t0.

Then, the content searching unit 54 calculates a difference D(i) between a song tempo Tempo(i) and the key value Tek as a walking tempo detection result by using expression (1) shown in FIG. 9 for each song recorded in the content database 51 with the search period of time period Tc. Accordingly, the content searching unit 54 selects a song in which the difference D(i) is the smallest, that is, a song whose tempo is the most approximate to the walking tempo at the time, as a search result.

For example, referring to the example shown in FIG. 6, if the key value Tek as a walking tempo detection result is 105, the difference D(3) between the key value Tek and Tempo(3) =104 of the song of ID(i)=3 is the smallest at 1, and thus the song of ID(i)=3 is selected.

If the key value Tek as a walking tempo detection result is 100, the difference D(7) between the key value Tek and Tempo(7)=102 of the song of ID(i)=7 and the difference D(13) between the key value Tek and Tempo(13)=98 of the song of ID(i)=13 are the smallest at 2.

If the difference D(i) is the smallest in a plurality of songs as in the above-described case, the content searching unit 54 selects a song having the highest score. In the above-described example, the score of the song of ID(i)=7 is 4, whereas the score of the song of ID(i)=13 is 0. Thus, the song of ID(i)=7 is selected.

Alternatively, a search program may be designed so that the content searching unit 54 randomly selects a song if the difference D(i) is the smallest in a plurality of songs.

Further, the search program may be designed so that the content searching unit 54 randomly selects a song if the difference D(i) is the smallest in a plurality of songs and if the scores of those songs are the same.

Further, if the environment detecting unit including the environment sensor 44 and the encoder 45 is provided to detect the environment of a predetermined situation at predetermined time by classifying it into a season, day or night, cold or warm, indoor or outdoor, and a location such as seaside or piedmont, as in the example shown in FIG. 1, the search program may be designed so that the content searching unit 54 selects a song whose song appendix information (the name of song, album, etc.) includes a word or phrase indicating the detected environment from among a plurality of songs in which the difference D(i) is the smallest.

Still further, information indicating an environment suitable for a song may be added as song appendix information. In that case, the search program may be designed so that the content searching unit 54 selects a song whose environment information matches the environment detected by the environment detecting unit if the difference D(i) is the smallest in a plurality of songs.

If the walking tempo of the user is slow, for example, if the walking tempo is 50, a song whose tempo does not match the walking tempo of the user can be selected. For example, as can be seen in FIG. 6, the difference D(i) obtained through expression (1) shown in FIG. 9 is the smallest in tempo 82.

In order to avoid such a problem, the search program may be designed so that the difference D(i) is calculated by using expression (2) instead of expression (1) shown in FIG. 9 if the key value Tek as a walking tempo detection result is equal to or smaller than a predetermined threshold. In expression (2), the key value Tek is corrected n-fold. Herein, n is 2 or 3.

Accordingly, when the key value Tek as a walking tempo detection result is 50 and when n is 2, a search result obtained is the same as that when the difference D(i) is calculated by using expression (1) with the key value Tek being 100. As a result, a song having a song tempo suitable for the walking tempo of the user (a song whose song tempo is twice the walking tempo of the user) is selected.

On the other hand, if the walking tempo of the user is fast, for example, if the walking tempo is 200, a song whose tempo does not match the walking tempo of the user can be selected. For example, as can be seen in FIG. 6, the difference D(i) obtained through expression (1) shown in FIG. 9 is the smallest in tempo 140.

In order to avoid such a problem, the search program may be designed so that the difference D(i) is calculated by using expression (3) instead of expression (1) shown in FIG. 9 if the key value Tek as a walking tempo detection result is equal to or larger than a predetermined threshold. In expression (3), the key value Tek is corrected 1/n-fold. Herein, n is 2 or 3.

Accordingly, when the key value Tek as a walking tempo detection result is 200 and when n is 2, a search result obtained is the same as that when the difference D(i) is calculated by using expression (1) with the key value Tek being 100. As a result, a song having a song tempo suitable for the walking tempo of the user (a song whose song tempo is about half of the walking tempo of the user) is selected.

As a result of the above-described search, in the example shown in FIG. 8, the same song A is selected with the search period Tc during period P10, different songs are selected in accordance with a decrease in the walking tempo of the user during period P20, the same song F is selected with the search period Tc during period P30, different songs are selected in accordance with an increase in the walking tempo of the user during period P40, and the same song L is selected with the search period Tc during period P50.

According to a playback program used to play back a song found by search, if the same song is selected at every search performed with the search period Tc, as in period P10, P30, or P50, the song is continuously played back from the part that was played back last time without turning back to its start.

However, if period P10 is longer than the time length of entire song A, song A is played back from its start through the end, and is then played back from its start again.

Alternatively, in the search program and the playback program, if the difference D(i) calculated by using expression (1), (2), or (3) is the smallest in a plurality of songs including song A, song A is played back first, and then another song of the same D(i) is selected to be played back.

In the case where the walking tempo becomes slow as in period P20, a value obtained by subtracting a predetermined value a from a walking tempo detection value may be set to the key value Tek as a walking tempo detection result. On the other hand, in the case where the walking tempo becomes fast as in period P40, a value obtained by adding a predetermined value α to a walking tempo detection value may be set to the key value Tek as a walking tempo detection result. The value α corresponds to a tempo of about 5 per minute. Accordingly, a song can be searched for while estimating a change in the walking tempo of the user.

Also, a program to detect a movement tempo and search for a song may be designed so that time period Tc of the search period becomes longer than that in the case where the change rate of the walking tempo is equal to or smaller than a predetermined value if the change rate of the walking tempo exceeds the predetermined value. Accordingly, it can be prevented that a played back song is frequently changed at short intervals of a few seconds or less due to significant changes in the walking tempo.

When a played back song is changed in accordance with a search result, it is desirable to fade out the present song and fade in the next song.

In some songs, tempo is different in each part of the song. For example, the tempo of the start of a song is 102 and the tempo of the other part of the song is 98.

In such a song, for example, information indicating the tempo of each part of the song is added as song appendix information, the difference D(i) is calculated for the respective parts, and only the part in which the difference D(i) is the smallest or the entire song is selected.

Alternatively, information indicating the tempo of the start or climax of a song may be added as song appendix information. If the song is selected as a song in which the difference D(i) is the smallest, only the start or climax of the song is played back, or the song is played back from its start until another song is selected.

Figure 10:
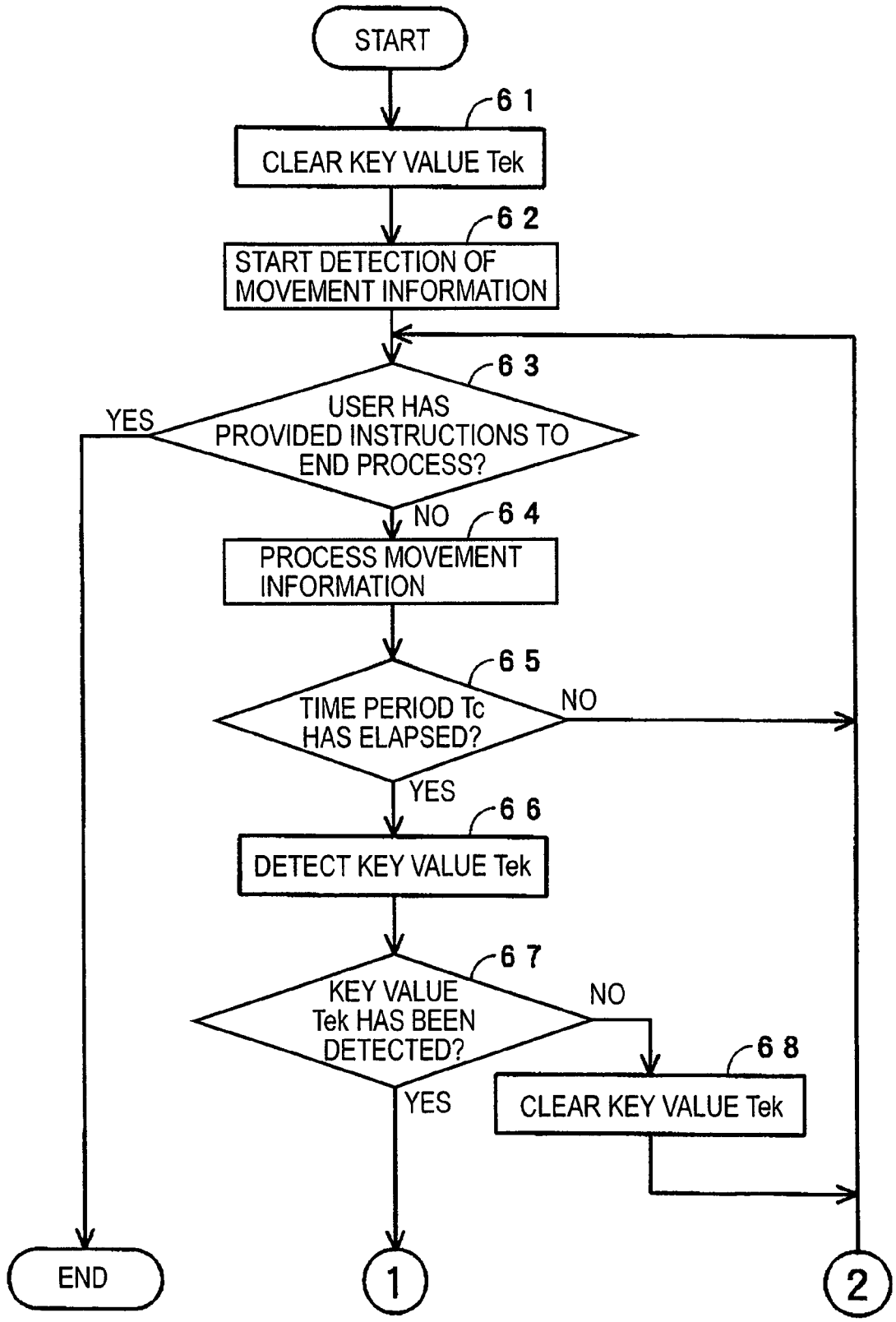
FIG. 10 shows a part of a process routine of searching for a song.
Figure 11:
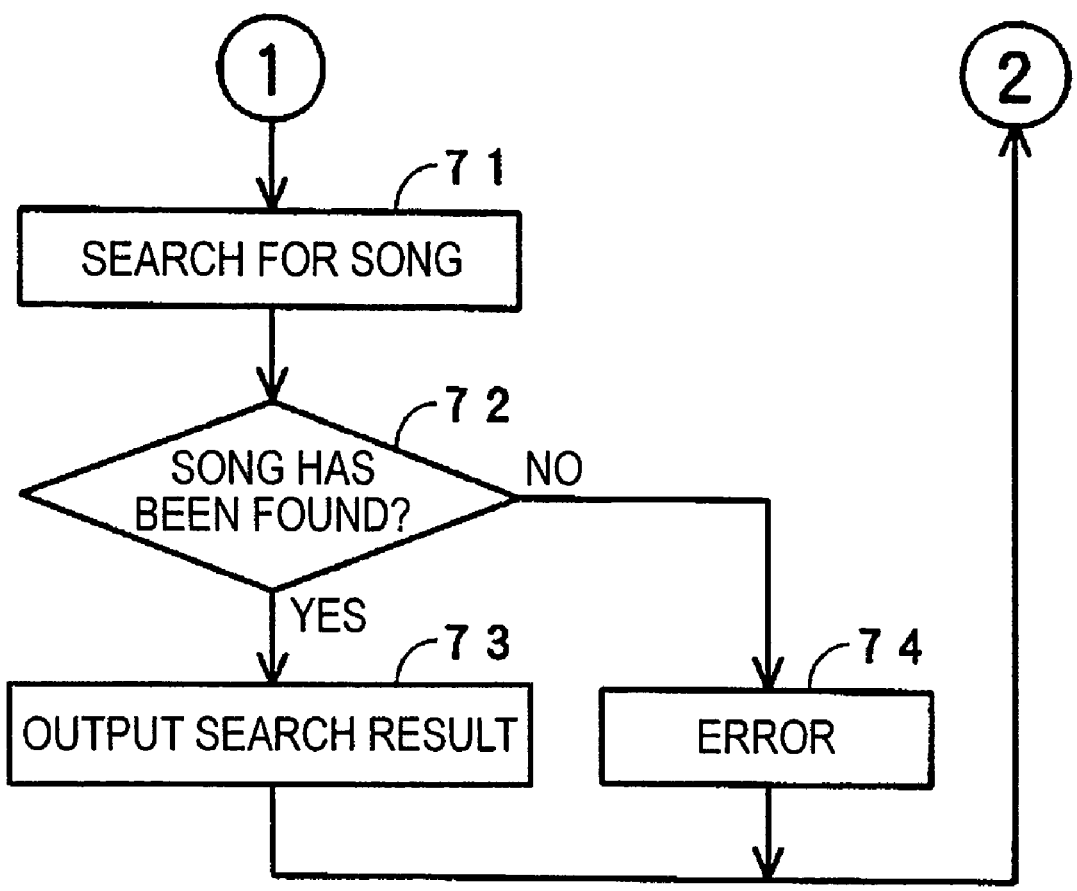
FIG. 11 shows the rest of the process routine of searching for a song.

FIGS. 10 and 11 show an example of an entire process performed by the user terminal 11 to perform the above-described tempo-based search for a song.

The user terminal 11 starts the process in response to instructions to start search from a user. In step 61, the user terminal 11 clears the key value Tek as a movement tempo detection result. In step 62, the movement information detecting unit 52 starts to detect movement information. In step 63, the user terminal 11 determines whether the user has provided instructions to end the process, and ends the process if the user has provided the instructions.

If the user has not provided the instructions to end the process, process proceeds from step 63 to step 64, where the key information detecting unit 53 processes movement information output from the movement information detecting unit 52. Then, in step 65, the user terminal 11 determines whether time period Tc of the search period has elapsed. If time period Tc has not elapsed, the process returns to step 63. Then, if the instructions to end the process from the user have not been provided, the process proceeds to step 64, where processing the movement information is continued.

If it is determined in step 65 that time period Tc has elapsed, the process proceeds to step 66, where the key information detecting unit 53 detects a movement tempo as a key value Tek from a result obtained in step 64. Then, in step 67, the user terminal 11 determines whether a key value Tek has been detected. If a key value Tek has not been detected because the user does not move, for example, the process proceeds from step 67 to step 68. Then, the user terminal 11 clears the key value Tek as in step 61 and continues the process in the next search period from step 63.

If it is determined in step 67 that a key value Tek has been detected, the process proceeds to step 71, where the user terminal 11 searches for a song in the above-described method. Then, the user terminal 11 determines whether a song has been found in step 72. If a song has been found, the process proceeds to step 73, where the user terminal 11 outputs a search result, and then the process returns to step 63. If a song has not been found, the process proceeds to step 74, where an error process is performed. Then, the process returns to step 63.

In the output step 73, the song found in search is played back or the artist and name of the found song are displayed. In the error step 74, a message "a song is not found" is displayed or announced.

In the above-described tempo-based search for a song, the user terminal 11 can be allowed to search for a song having a song tempo according to a movement tempo of a user, as in the following examples.

(1a) A song having a song tempo according to a walking tempo is searched for. For example, a song having a slow song tempo is searched for when the walking tempo is slow, whereas a song having a fast song tempo is searched for when the walking tempo is fast.

(1b) A song having a song tempo according to a key-button pressing tempo is searched for. For example, while a user writes a mail on a mobile phone terminal, a song having a slow song tempo is searched for when the key-button pressing tempo is slow, whereas a song having a fast song tempo is searched for when the key-button pressing tempo is fast.

(1c) A song having a song tempo according to a keyboard tapping tempo is searched for. For example, while a user inputs a sentence on a personal computer, a song having a slow song tempo is searched for when the keyboard tapping tempo is slow, whereas a song having a fast song tempo is searched for when the keyboard tapping tempo is fast.

(1d) A karaoke song having a song tempo according to a shaking tempo of a microphone or remote control is searched for. For example, while a user sings a karaoke song, a karaoke song having a slow song tempo is searched for when the shaking tempo of the microphone or remote control is slow, whereas a karaoke song having a fast song tempo is searched for when the shaking tempo of the microphone or remote control is fast.

(1e) While a user runs on a treadmill, a song having a song tempo according to a running tempo of the user, which matches a running tempo of the treadmill, is searched for.

(1-6. Tempo-Based Search for a Song List: FIGS. 12 to 16)

FIG. 12 shows an example of song lists recorded in the content database 51 in the case where tempo-based search for a song list is performed.

Song list 1 lists slow-tempo songs whose tempo is under 110. Song list 2 lists songs that are appropriate for walking, whose tempo is 110 or more and under 150. Song list 3 lists songs that are appropriate for jogging, whose tempo is 150 or more.

More specifically, as shown in FIG. 13, song list 1 lists eight songs whose IDs are 1-1 to 1-8. Song list 2 lists six songs whose IDs are 2-1 to 2-6. Song list 3 lists five songs whose IDs are 3-1 to 3-5.

In each of song lists 1 to 3, song appendix information of the listed songs as shown in FIG. 6, that is, the name of artist, the name of song, the name of album, tempo(i), and score, are written.

Figure 14:
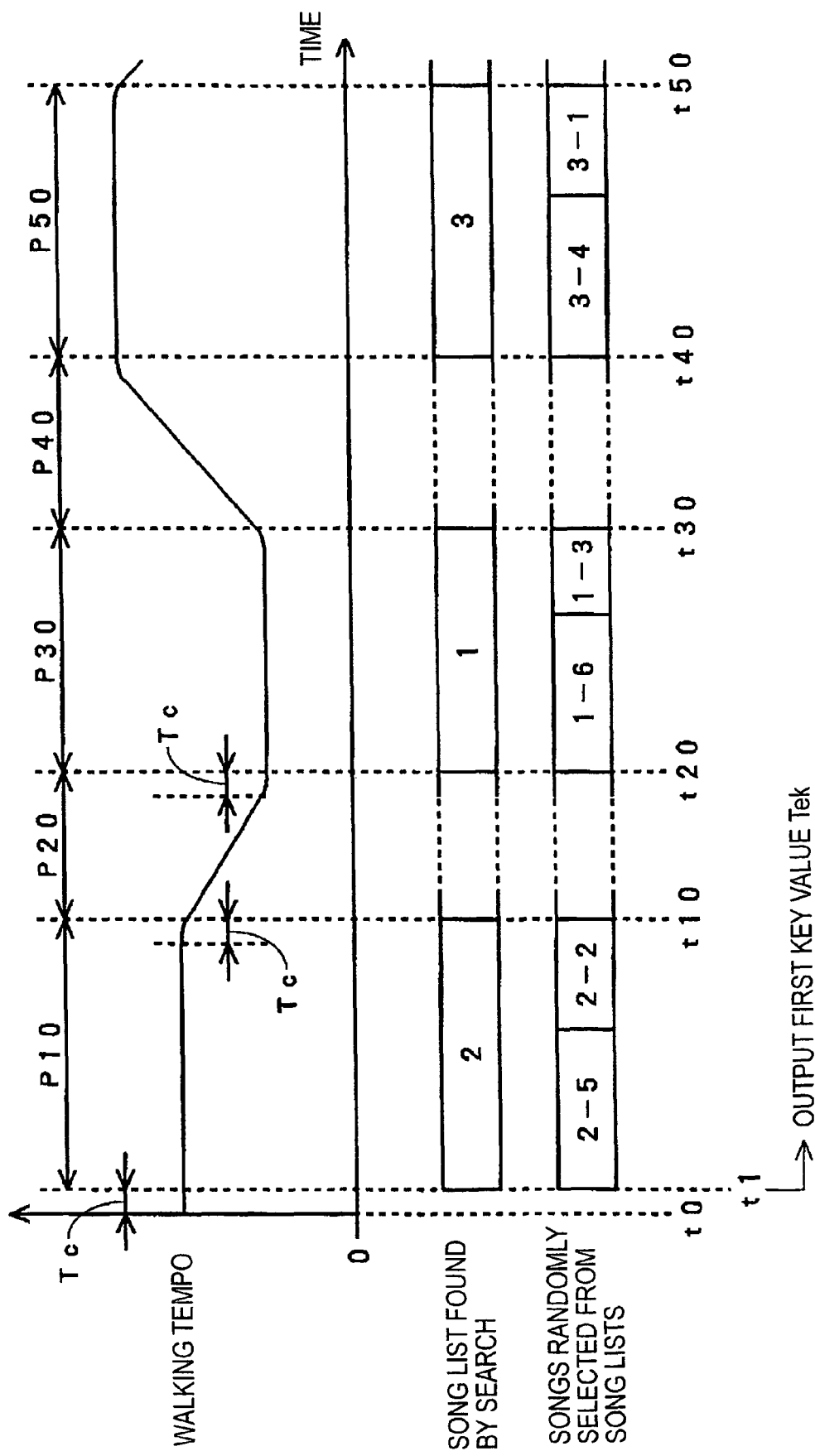
FIG. 14 shows an example of a state where different song lists are found by search in accordance with change in walking tempo.

FIG. 14 shows an example of tempo-based search for a song list, that is, an example of change in walking tempo in the case where a song list listing songs having a song tempo according to a walking tempo of a user is searched for. The change in walking tempo shown in this example is the same as that shown in FIG. 8.

The content list searching unit 56 shown in FIG. 3 captures a key value Tek detected as a walking tempo from the key information detecting unit 53 with the preset search period Tc, as in the case of tempo-based search for a song shown in FIG. 8. Then, the content list searching unit 56 determines whether the key value Tek is under 110, 110 or more, under 150, or 150 or more with the search period of time period Tc.

The content list searching unit 56 selects song list 1 if the key value Tek is under 110, selects song list 2 if the key value Tek is 110 or more and under 150, and selects song list 3 if the key value Tek is 150 or more.

Further, as in the tempo-based search for a song, the content list searching unit 56 corrects the key value Tek n-fold (n is 2 or 3) if the key value Tek is equal to or smaller than a predetermined threshold, for example, if the key value Tek is 50. On the other hand, if the key value Tek is equal to or larger than a predetermined threshold, for example, if the key value Tek is 200, the content list searching unit 56 corrects the key value Tek 1/n-fold (n is 2 or 3).

As a result of the above-described search, in the example shown in FIG. 14, song list 2 is selected in period P10 from time t1 to time t10, different song lists are selected in accordance with a decrease in the walking tempo of the user in period P20 from time t10 to time t20, song list 1 is selected in period P30 from time t20 to time t30, different song lists are selected in accordance with an increase in the walking tempo of the user in period P40 from time t30 to time t40, and song list 3 is selected in period P50 from time t40 to time t50.

In addition, when songs are to be selected from a found song list and are to be played back, the songs are selected and are played back in any of the following methods.

(2a) Songs are randomly selected from the found song list and are played back.

(2b) Songs are selected from the found list in numerical order (ascending order of ID number) and are played back.

(2c) Songs are selected from the found list in descending order of score. If the song list includes a plurality of songs of the same score, a song is selected from among the songs randomly or in numerical order and is played back.

(2d) The artist and name of each song in the found song list are displayed in the LCD unit 34 so as to be presented to the user, the user specifies a song among the songs, and the CPU 16 selects and plays back the specified song.

The song lists are formally generated. If no song is listed in the song list, a song that is presently being played back is played back continuously, or a notification indicating that no song is listed is presented to the user so that the user provides next instructions.

In the example shown in FIG. 14, the above-described method (2a) is used. In period P10, song 2-5 is selected from song list 2 first. After song 2-5 has been played back, song 2-2 is selected from song list 2. In period P30, song 1-6 is selected from song list 1 first. After song 1-6 has been played back, song 1-3 is selected from song list 1. In period P50, song 3-4 is selected from song list 3 first. After song 3-4 has been played back, song 3-1 is selected from song list 3.

Figure 15:
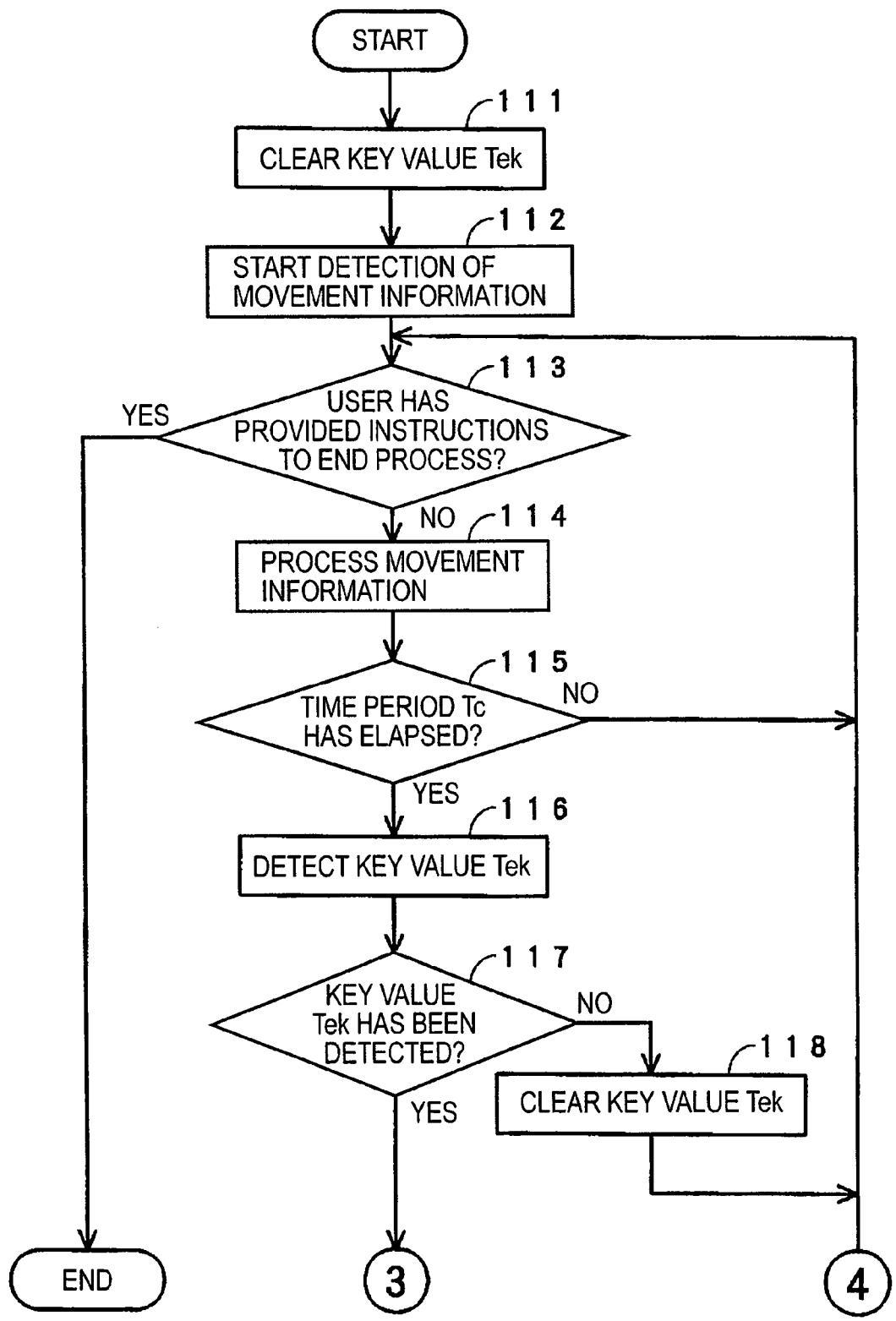
FIG. 15 shows a part of a process routine of searching for a song list.
Figure 16:
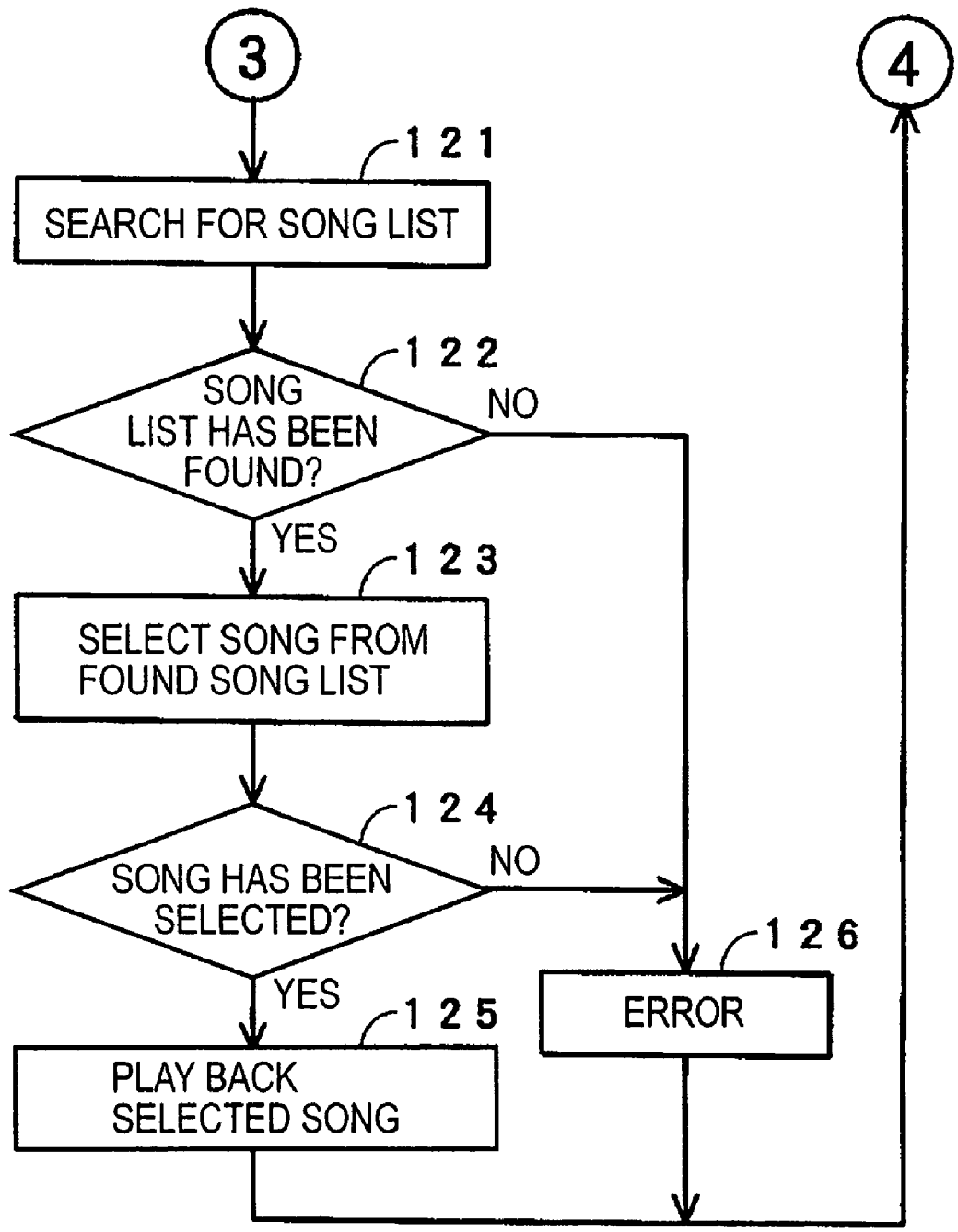
FIG. 16 shows the rest of the process routine of searching for a song list.

FIGS. 15 and 16 show an example of an entire process performed by the user terminal 11 to perform the above-described tempo-based search for a song list.

The user terminal 11 starts the process in response to instructions to start search from a user. In step 111, the user terminal 11 clears the key value Tek as a movement tempo detection result. In step 112, the movement information detecting unit 52 starts to detect movement information. In step 113, the user terminal 11 determines whether the user has provided instructions to end the process, and ends the process if the user has provided the instructions.

If the user has not provided the instructions to end the process, process proceeds from step 113 to step 114, where the key information detecting unit 53 processes movement information output from the movement information detecting unit 52. Then, in step 115, the user terminal 11 determines whether time period Tc of the search period has elapsed. If time period Tc has not elapsed, the process returns to step 113. Then, if the instructions to end the process from the user have not been provided, the process proceeds to step 114, where processing the movement information is continued.

If it is determined in step 115 that time period Tc has elapsed, the process proceeds to step 116, where the key information detecting unit 53 detects a movement tempo as a key value Tek from a result obtained in step 114. Then, in step 117, the user terminal 11 determines whether a key value Tek has been detected. If a key value Tek has not been detected because the user does not move, for example, the process proceeds from step 117 to step 118. Then, the user terminal 11 clears the key value Tek as in step 111 and continues the process in the next search period from step 113.

If it is determined in step 117 that a key value Tek has been detected, the process proceeds to step 121, where the user terminal 11 searches for a song list in the above-described method. Then, the user terminal 11 determines whether a song list has been found in step 122. If a song list has been found, the process proceeds to step 123, where the user terminal 11 selects a song from the found list in the above-described method. Then, in step 124, the user terminal 11 determines whether a song has been selected. If a song has been selected, the process proceeds to step 125, where the selected song is played back (playback of the selected song starts). Then, the process returns to step 113.

If it is determined in step 122 that a song list has not been found or if it is determined in step 124 that a song has not been selected, the process proceeds to step 126 to perform an error process. That is, a message "a song list is not found" or "a song is not selected" is displayed or announced, and then, the process returns to step 113.

In the above-described manner, a song list is searched for and a song is selected from the found list and is played back. In order to output a search result, the following methods can be used.

(3a) The artist and name of each song listed in a found list are displayed in the LCD unit 34 so as to be presented to the user.

(3b) ID information (number) and name of a found song list or the artist and name of a song selected from the found song list are registered in the internal storage device 21 or the external storage device 23 in time series of search.

(3c) The content of a found song list (the artist and name of each song listed in the found song list) or the artist and name of a song selected from the found song list are transmitted to another user terminal through the Internet 100 or a communication network such as a mobile phone network or a radio communication network so as to be provided to another user.

In the above-described search for a song list, the difference D(i) shown in FIG. 9 need not be calculated for each song recorded in the content database 51, unlike in the case where a song is directly searched for by using a key value Tek. Accordingly, the burden of a searching process can be significantly reduced.

(1-7. Rhythm-Based Search for a Song or a Song List: FIGS. 17 and 18)

When a user does exercise, such as a dancing movement or stretch, he/she changes a movement rhythm during the exercise in many cases. For example, he/she sometimes moves his/her feet or body in a samba rhythm, and he/she sometimes moves his/her feet or body in a salsa rhythm. Also, he/she may move his/her feet or body in a samba rhythm first, and then move his/her feet or body in a salsa rhythm.

In this case, the waveform itself of a signal output from the movement sensor 41 changes. That is, when a user walks over a predetermined time period while changing a walking tempo, as in the above-described case, the period of a sensor output signal changes but the waveform thereof does not change and is kept in a sin-wave form. On the other hand, if a movement rhythm changes, the waveform itself of the sensor output signal changes.

When the movement rhythm of a user changes, it is desirable that a song having a song rhythm that matches the movement rhythm at the time should be searched for and played back.

Therefore, in rhythm-based search for a song or a song list, a movement rhythm of a user is detected, and then a song having a song rhythm according to the detected movement rhythm is searched for, or a song list listing songs having a song rhythm according to the detected movement rhythm is searched for in the following way.

In order to detect a movement rhythm, representative rhythm patterns (waveforms) are registered as rhythm pattern data in the user terminal 11 in advance.

FIG. 17 shows representative rhythm patterns. In these graphs, the horizontal axis indicates time and the vertical axis indicates a signal level.

In pattern A, three intermediate crests exist between high crests. In pattern B, two intermediate crests exist between high crests. In pattern C, a low crest exists between intermediate crests. In pattern D, the part between intermediate crests changes only slightly.

The key information detecting unit 53 shown in FIGS. 2 or 3 processes movement information output from the movement information detecting unit 52 and determines the signal waveform of the movement information. Then, the key information detecting unit 53 compares the signal waveform with the respective rhythm patterns registered as rhythm pattern data so as to determine whether the movement pattern at that time corresponds to any of patterns A, B, C, and D, and outputs a determination result (detection result) as a key code.

As the song appendix information of each song recorded in the content database 51, a rhythm code (name of rhythm) indicating the rhythm of a corresponding song is stored instead of or in addition to the above-described Tempo(i).

<1-7-1. Rhythm-Based Search for a Song>

In rhythm-based search for a song, the content searching unit 54 shown in FIG. 2 selects a song whose rhythm code matches the key code of a movement pattern detection result from among the songs recorded in the content database 51 with a predetermined search period.

If there exist a plurality of songs whose rhythm code matches the key code, one of the songs is selected as in the tempo-based search for a song by using any of the following methods.

(4a) Select a song having the highest score.
(4b) Randomly select one of the songs.
(4c) Select a song that matches the environment at that time.

The above-described Tempo(i) may be added together with a rhythm code to song appendix information. In that case, the key information detecting unit 53 may specify a movement pattern and output it as a key code as described above, and may detect a movement tempo as a key value Tek as in the tempo-based search for a song. If there are a plurality of songs in which the rhythm code matches the key code, the content searching unit 54 may select a song in which the difference D(i) is the smallest.

An entire process performed by the user terminal 11 to perform the above-described rhythm-based search for a song is the same as the process shown in FIGS. 10 and 11 except that a key value Tek is replaced by a key code.

<1-7-2. Rhythm-Based Search for a Song List>

In rhythm-based search for a song list, as shown in FIG. 18, songs having a rhythm of the above-described pattern A are listed in song list 1, songs having a rhythm of the above-described pattern B are listed in song list 2, songs having a rhythm of the above-described pattern C are listed in song list 3, and songs having a rhythm of the above-described pattern D are listed in song list 4.

In rhythm-based search for a song list, the content list searching unit 56 shown in FIG. 3 selects a song list in which the rhythm code matches (corresponds to) a key code as a movement pattern determination result (detection result) from among song lists 1 to 4 recorded in the content database 51 with a predetermined search period.

Furthermore, when a song is to be selected from the found list, the song is selected in any of the above-described methods (2a) to (2d) as in the case of tempo-based search for a song list.

An entire process performed by the user terminal 11 to perform the above-described rhythm-based search for a song list is the same as that shown in FIGS. 15 and 16 except that a key value Tek is replaced by a key code.

(1-8. Search for a Song or a Song List Based on Registration and Call of Key Information)

In the above-described example, detection of a movement tempo or a movement rhythm of a user and search for a song or a song list using key information as a detection result are performed at the same time. However, the following method can also be applied as described in the following example. Upon detection of a movement tempo or a movement rhythm of a user, key information as a detection result is registered, so that the movement tempo or the movement rhythm of the user is detected. After the key information has been registered, the following searches can be performed by calling the registered key information without newly detecting a movement tempo or a movement rhythm of the user: search for a song having a song tempo suitable for a movement tempo of the user; search for a song list listing songs having a song tempo suitable for a movement tempo of the user; search for a song having a song rhythm suitable for a movement rhythm of the user; or search for a song list listing songs having a song rhythm suitable for a movement rhythm of the user.

As an example, the case where a user has the following common practice is described:

(A) the user walks at a little quick pace from his/her home to the station to commute on weekday mornings;
(B) the user jogs in a park near the workplace on Monday, Wednesday, and Friday evenings; and
(C) the user takes a leisurely stroll near his/her home on Saturday and Monday mornings.

In each of these cases (A), (B), and (C), the user specifies a tempo mode (tempo name) on the user terminal 11 and allows the user terminal 11 to detect and register a walking tempo (movement tempo) as key information when actually walking at the first time or severalth-time.

For example, in case (A), the tempo mode is set to "tempo A" or "morning". In case (B), the tempo mode is set to "tempo B" or "evening". In case (C), the tempo mode is set to "tempo C" or "holiday".

Accordingly, in the user terminal 11, the movement information detecting unit 52 detects movements of the user as movement information, the key information detecting unit 53 detects a walking tempo (movement tempo) of the user as key information, and the CPU 16 associates the key information as a walking tempo detection result with the above-mentioned specified tempo mode and registers it in the internal storage device 21 or the external storage device 23.

If the walking tempo changes during walking, the following methods are used.

(x) In the case where the walking tempo is generally constant with only a slight change except when the user stops walking at an intersection or the like, an average of the above-described plurality of walking tempo detection values is regarded as a key value Tek as a walking tempo detection result.

(y) In the case where the walking tempo significantly changes as in the example shown in FIG. 8, the walking tempo detection value that changes in time series in accordance with the change in walking tempo is regarded as a key value Tek as a walking tempo detection result.

As described above, under the condition that a key value Tek as a walking tempo detection result is registered while being associated with a tempo mode in respective cases (A), (B), and (C), when the user walks from his/her home to the station on weekday morning, the user may set a tempo mode to "tempo A" or "morning" and provide instructions to search for a song to the user terminal 11.

Accordingly, the CPU 16 of the user terminal 11 calls a registered key value Tek of the specified tempo mode, searches for a song having a song tempo that matches the walking tempo (movement tempo) indicated by the called key value Tek, and plays back the song.

Alternatively, the user terminal 11 may be configured so that the CPU 16 detects that the present time is "weekday morning" by using a calendar time circuit provided in the user terminal 11 and calls a registered key value Tek of the tempo mode "weekday morning" only if the user simply provides instructions to search for a song without specifying a tempo mode, such as "tempo A" or "morning".

In the content database 51, songs stored therein are continually updated because the user deletes an old song or adds a new song. Therefore, when the user terminal 11 searches for a song by calling a registered key value Tek on weekday mornings, it is less likely to occur that the same song is found and played back every morning, so that the user can listen to different songs.

Tempo-based search for a song has been described above, but the same is applied to the case of tempo-based search for a song list, rhythm-based search for a song, or rhythm-based search for a song list.

(1-9. Another Method on Search for a Song or a Song List)

In the above-described example, information indicating a song tempo or a song rhythm is added as song appendix information. Alternatively, a song tempo or a song rhythm of each song may be detected every time a song is searched for.

If numerous songs are recorded in the content database 51, it takes much time to detect a song tempo or a song rhythm of each song. In that case, the time required to detect a song tempo or a song rhythm can be shortened if the user terminal 11 is configured so that the user specifies a classification as a search range when the user provides instructions to search for a song and that the user terminal 11 searches for a song that matches the movement tempo or movement rhythm from among songs belonging to the specified classification. The specified classification is a specific genre or song list.

Alternatively, the user terminal 11 may be compatible with some of tempo-based search for a song, tempo-based search for a song list, rhythm-based search for a song, and rhythm-based search for a song list. With this configuration, the user can select one of them and allow the user terminal 11 to execute it.

Figure 19:
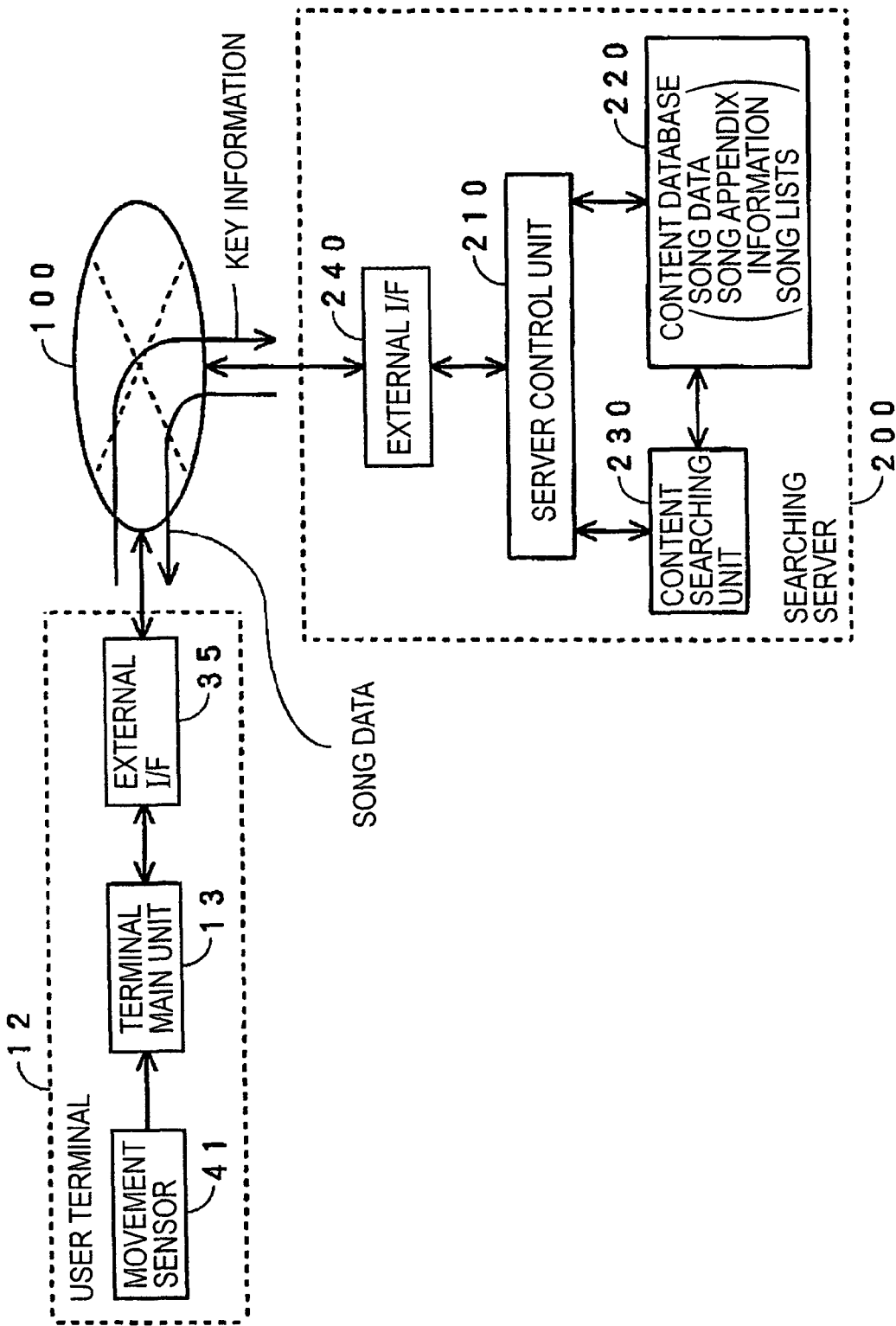
FIG. 19 shows an example of a searching system on the Internet.
Figure 20:
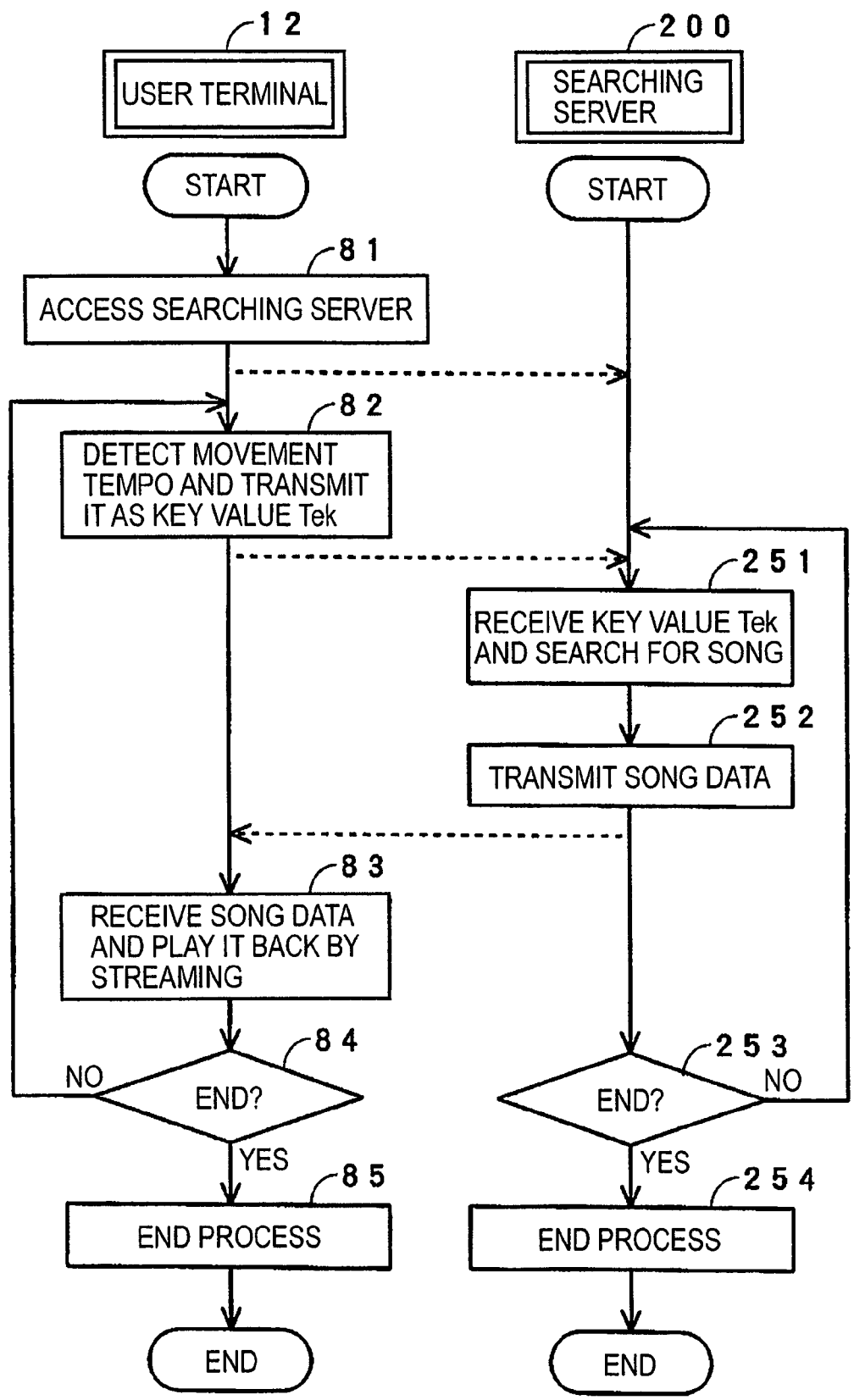
FIG. 20 shows an example of a process routine performed in the searching system shown in FIG. 19.
Figure 21:
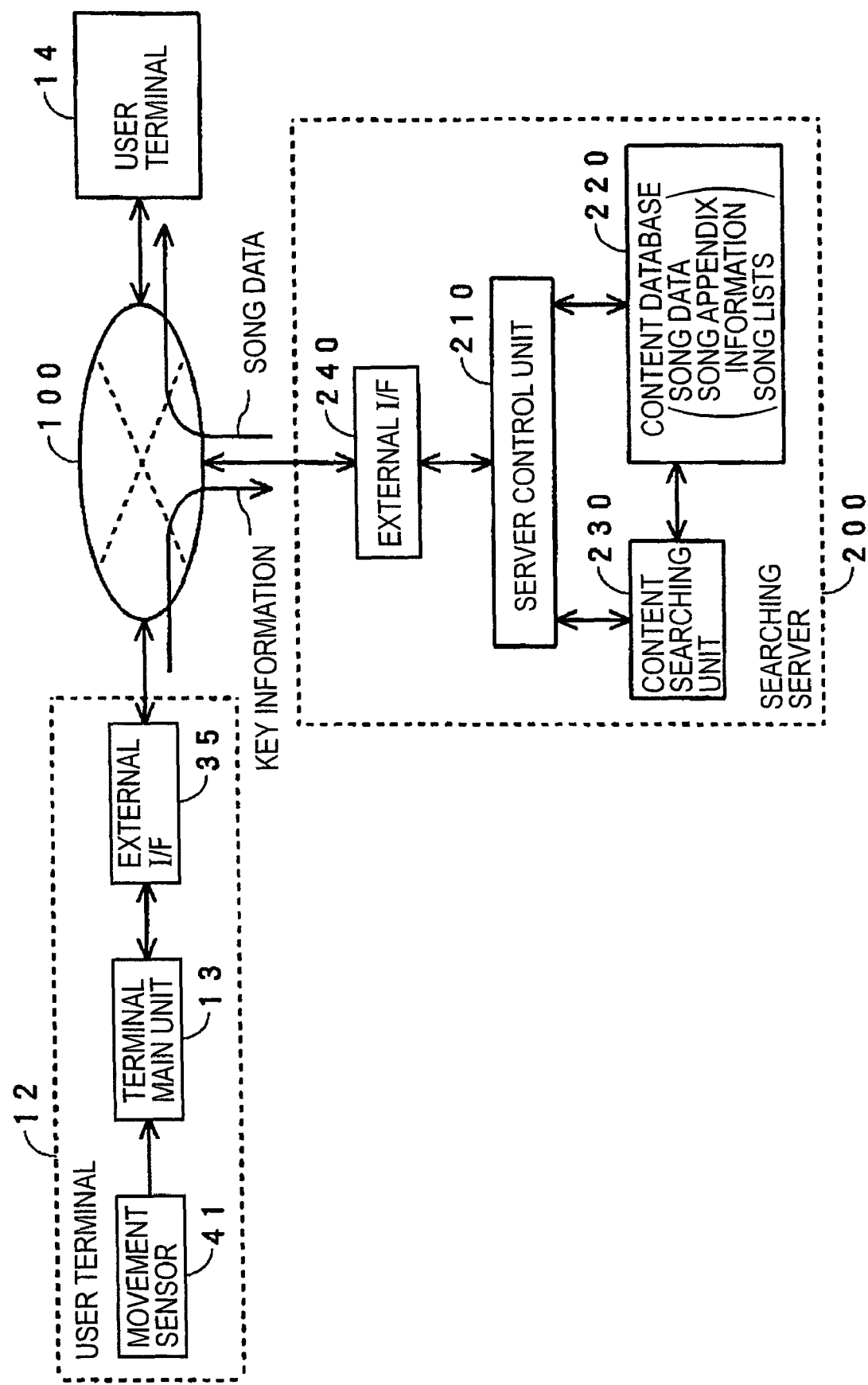
FIG. 21 shows another example of the searching system on the Internet.

2. Second Embodiment: FIGS. 19 to 21

As a second embodiment, a song searching system or a song list searching system in which a user terminal accesses a searching server through the Internet is described. Also, a song searching method or a song list searching method used in the searching system is described.

2-1. FIRST EXAMPLE: FIGS. 19 AND 20

FIG. 19 shows an example of the searching system. In this example, a user terminal 12 accesses a searching server 200 through the Internet 100.

The user terminal 12 is a music playback apparatus or a personal computer having a function to access the internet 100. As the user terminal 11 shown in FIG. 1, the user terminal 12 includes a terminal main unit 13 that connects to a movement sensor 41 and an external interface 35.

However, in this example, a song is searched for or selected in the searching server 200, and song data for streaming playback in the user terminal 12 is transmitted from the searching server 200 to the user terminal 12. Thus, the terminal main unit 13 of the user terminal 12 does not need the content database 51 shown in FIGS. 2 or 3.

The searching server 200 searches for a song or a song list, transmits song data of a found song or song data of a song selected from a found song list to the user terminal 12, and serves as a distribution server. In the searching server 200, a server control unit 210 connects to a content database 220, a content searching unit 230, and an external interface 240. The searching server 200 accesses the Internet 100 through the external interface 240. In the content database 220, song data and song appendix information of many songs are accumulated and a plurality of song lists are recorded.

That is, in this searching system, the movement information detecting unit 52 and the key information detecting unit 53 shown in FIGS. 2 or 3 are included in the user terminal 12. The content database 51 shown in FIGS. 2 or 3 and the content searching unit 54 shown in FIG. 2 or the content list searching unit 56 shown in FIG. 3 are provided in the searching server 200 as the content database 220 and the content searching unit 230.

In tempo-based search for a song, the movement information detecting unit 52 of the user terminal 12 detects movements of a user as movement information, and the key information detecting unit 53 of the user terminal 12 processes and analyzes the movement information in order to detect a movement tempo of the user as key information (key value Tek), as in the first embodiment.

The user terminal 12 transmits the detected key information (key value Tek) to the searching server 200 through the Internet 100.

The searching server 200 receives the transmitted key information (key value Tek) and the content searching unit 230 therein searches for a song in the same method as that used in the first embodiment. Note that, popularity of a corresponding song among users of the system on the Internet 100, indicated as category 4 in FIG. 7, is used as score. In this case, level 0 corresponds to least popular and level 4 corresponds to most popular, as in the above-described category 1.

The searching server 200 transmits song data of a found song to the user terminal 12. The user terminal 12 plays back the found song using the transmitted song data in a streaming method.

The above-described process is performed with a predetermined search period, as in the first embodiment.

FIG. 20 shows an example of a process performed by the user terminal 12 and the searching server 200 during tempo-based search for a song.

The user terminal 12 accesses the searching server 200 in step 81. Then, the user terminal 12 detects a movement tempo of a user and transmits the movement tempo as a key value Tek to the searching server 200 in step 82.

In step 251, the searching server 200 receives the transmitted key value Tek and searches for a song having a song tempo according to the kay value Tek (the movement tempo of the user). Then, in step 252, the searching server 200 transmits song data of the found song to the user terminal 12.

In step 83, the user terminal 12 receives the transmitted song data and plays back the song in a streaming method.

Then, in step 84, the user terminal 12 determines whether the entire process should be ended. If the process should not be ended, the process returns to step 82. If the process should be ended, the process proceeds to step 85, where an end process is performed, and the entire process ends.

Also, the searching server 200 determines in step 253 whether the entire process on the user terminal 12 should be ended. If the process should not be ended, the process returns to step 251. If the process should be ended, the process proceeds to step 254, where an end process is performed, and the entire process on the user terminal 12 ends.

In tempo-based search for a song list, the searching server 200 searches for a song list and selects a song from the found song list in step 251 in the same method as that in the first embodiment. Then, in step 252, the searching server 200 transmits song data of the selected song to the user terminal 12.

In the above-described example, the user terminal 12 detects a movement tempo of a user as a key value Tek. Alternatively, the searching system may be configured so that the user terminal 12 transmits movement information of a user to the searching server 200 and that the searching server 200 detects a movement tempo of the user as a key value Tek from the movement information and searches for a song or a song list according to the key value Tek or the movement tempo of the user.

Tempo-based search for a song or a song list has been described above, but the same is applied to rhythm-based search for a song or a song list.

In the above-described example, song data of a song found by search or song data of a song selected from a found song list is transmitted from the searching server 200 to the user terminal 12 and the song data is played back in a streaming method in the user terminal 12. Alternatively, the following method can be adopted. That is, the user terminal 12 just downloads song data transmitted from the searching server 200 at search, and then plays back the downloaded song data. Otherwise, the searching server 200 does not transmit song data of a found song or song data of a song selected from a found song list to the user terminal 12 upon search. In that case, ID information of found or selected songs is recorded in the searching server 200 in searching time series (e.g., song A: 4 minutes and 20 seconds from the start, song B: next one minute and 5 seconds, . . . song X: next 18 seconds) or is transmitted from the searching server 200 to the user terminal 12 so as to be recorded in the user terminal 12. Then, the user terminal 12 plays back the found or selected songs in searching time series by receiving the song data from the searching server 200 or by using the song data recorded in the user terminal 12.

In addition, a song or a song list can be searched for by registering and calling key information in this searching system. In that case, any of the following methods can be used.

(5a) The user terminal 12 detects key information, registers the detected key information, and calls the registered key information. Then, the user terminal 12 transmits the called key information to the searching server 200, and the searching server 200 searches for a song or a song list by using the transmitted key information.

(5b) The user terminal 12 detects key information and transmits the detected key information to the searching server 200. The searching server 200 registers the transmitted key information, calls the registered key information in response to instructions to perform search from the user terminal 12, and searches for a song or a song list.

(5c) The user terminal 12 transmits movement information to the searching server 200. The searching server 200 detects key information from the transmitted movement information, registers the detected key information, calls the registered key information in response to instructions to perform search from the user terminal 12, and searches for a song or a song list.

2-2. SECOND EXAMPLE: FIG. 21

In the example shown in FIG. 19, a search result or a selection result is transmitted to the user terminal 12 of the user whose movement is detected. Alternatively, the search result or the selection result may be transmitted to a user terminal of another user so that the user terminal of another user can perform streaming playback.

FIG. 21 shows an example of a searching system of this case. In this example, user terminals 12 and 14 access the searching server 200 through the Internet 100.

The user terminal 12 shown in FIG. 21 is the same as that shown in FIG. 19. The user terminal 14 is a music playback apparatus or a personal computer having a function to access the Internet 100, as the user terminal 12. However, the user terminal 14 may not have a function to detect movements of a user. The searching server 200 is the same as that shown in FIG. 19.

In tempo-based search for a song or a song list, the movement information detecting unit 52 of the user terminal 12 detects movements of a user as movement information, and the key information detecting unit 53 of the user terminal 12 processes and analyzes the movement information so as to detect a movement tempo of the user as key information (key value Tek), as in the example shown in FIG. 19.

The user terminal 12 transmits the detected key information (key value Tek) to the searching server 200 through the Internet 100.

The searching server 200 receives the transmitted key information (key value Tek). Then, the content searching unit 230 searches for a song or a song list in the same method as in the first embodiment, that is, as in the example shown in FIG. 19. After a song list has been found, a song is selected from the found song list in the above-described method.

Then, the searching server 200 transmits song data of a found song or song data of a song selected from a found song list to the user terminal 14. The user terminal 14 plays back the transmitted song data in a streaming method.

In this case, transmission of song data from the searching server 200 to the user terminal 14 and streaming playback of the song data in the user terminal 14 are performed when the user terminal 14 accesses the searching server 200 during search (during detection of movements of a user) or after search (after detection of movements of a user).

In this example, a song having a song tempo according to a movement tempo of the user of the user terminal 12 can be played back in a streaming method in the user terminal 14 of another user. Therefore, the user of the user terminal 14 can know the movement tempo of the user of the user terminal 12 on the basis of the tempo of the played back song and can exercise at the same movement tempo.

For example, if the user terminal 14 can play back songs with higher sound quality than the user terminal 12, the user terminals 12 and 14 may be used by the same user. In that case, the user terminal 12 may detect movements of the user by using the movement sensor 41, whereas the user terminal 14 may play back a song that is found or selected by the searching server 200 with high sound quality.

In this example, the searching system may be configured so that the user terminal 12 transmits movement information of a user to the searching server 200, and that the searching server 200 detects a movement tempo of the user as a key value Tek from the movement information and searches for a song having a song tempo according to the key value Tek or the movement tempo of the user or a song list listing songs having a song tempo according to the movement tempo of the user.

The above description is about tempo-based search for a song or a song list, but the same can be applied to rhythm-based search for a song or a song list.

Alternatively, the user terminal 14 may just download song data transmitted from the searching server 200 and then play back the song data. The searching server 200 may not transmit song data of a found song or song data of a song selected from a found song list to the user terminal 14. Instead, ID information of found or selected songs may be recorded in the searching server 200 in searching time series as in the above-described first example or may be transmitted from the searching server 200 to the user terminal 14 so as to be recorded in the user terminal 14. Then, the user terminal 14 may play back the found or selected songs in searching time series by receiving the song data from the searching server 200 or by using the song data recorded in the user terminal 14.

Further, in this searching system, a song or a song list can be searched for by registering and calling key information by using the above-described methods (5a), (5b), and (5c).

Figure 22:
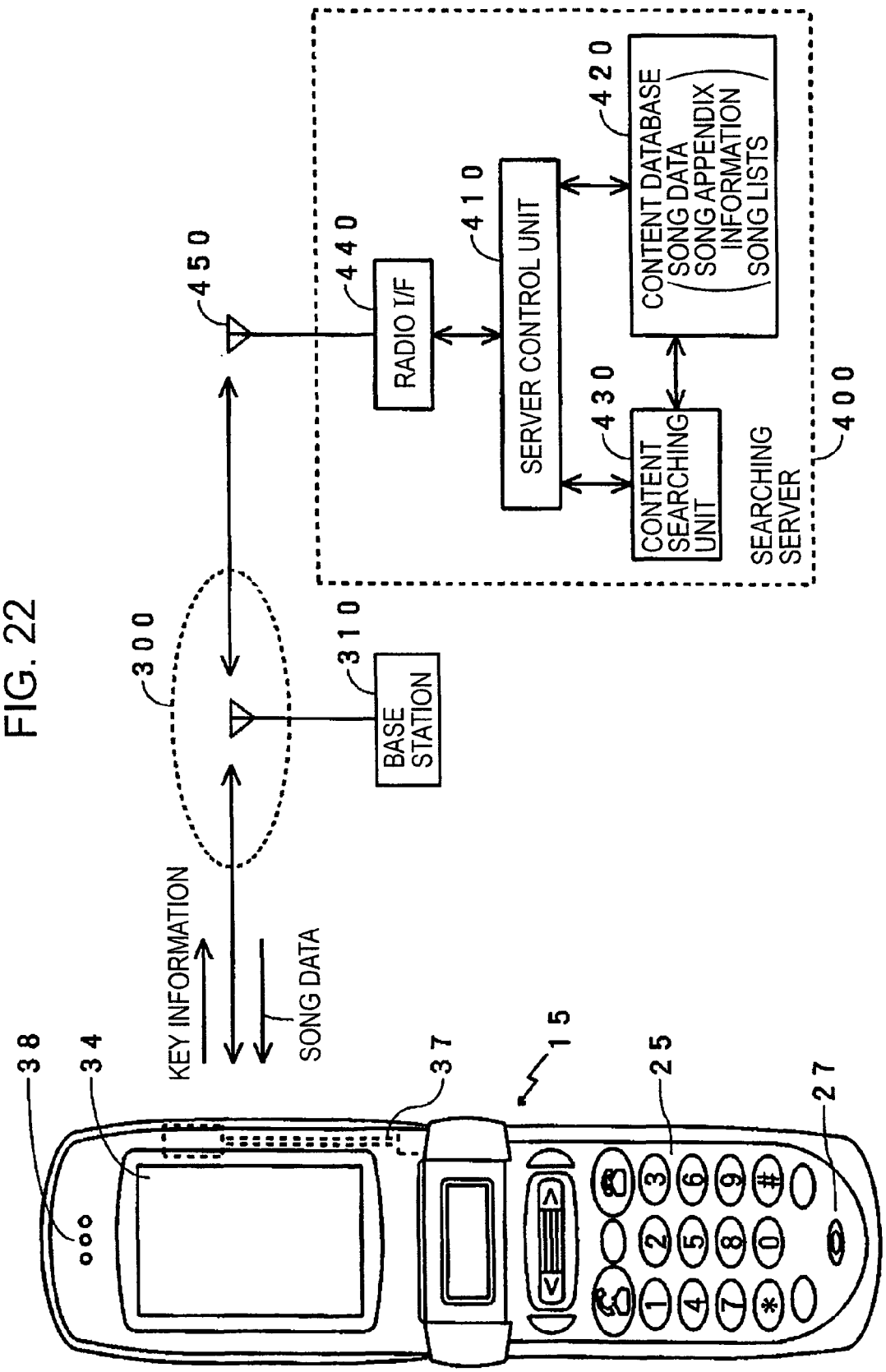
FIG. 22 shows an example of a searching system as a mobile phone network system.
Figure 23:
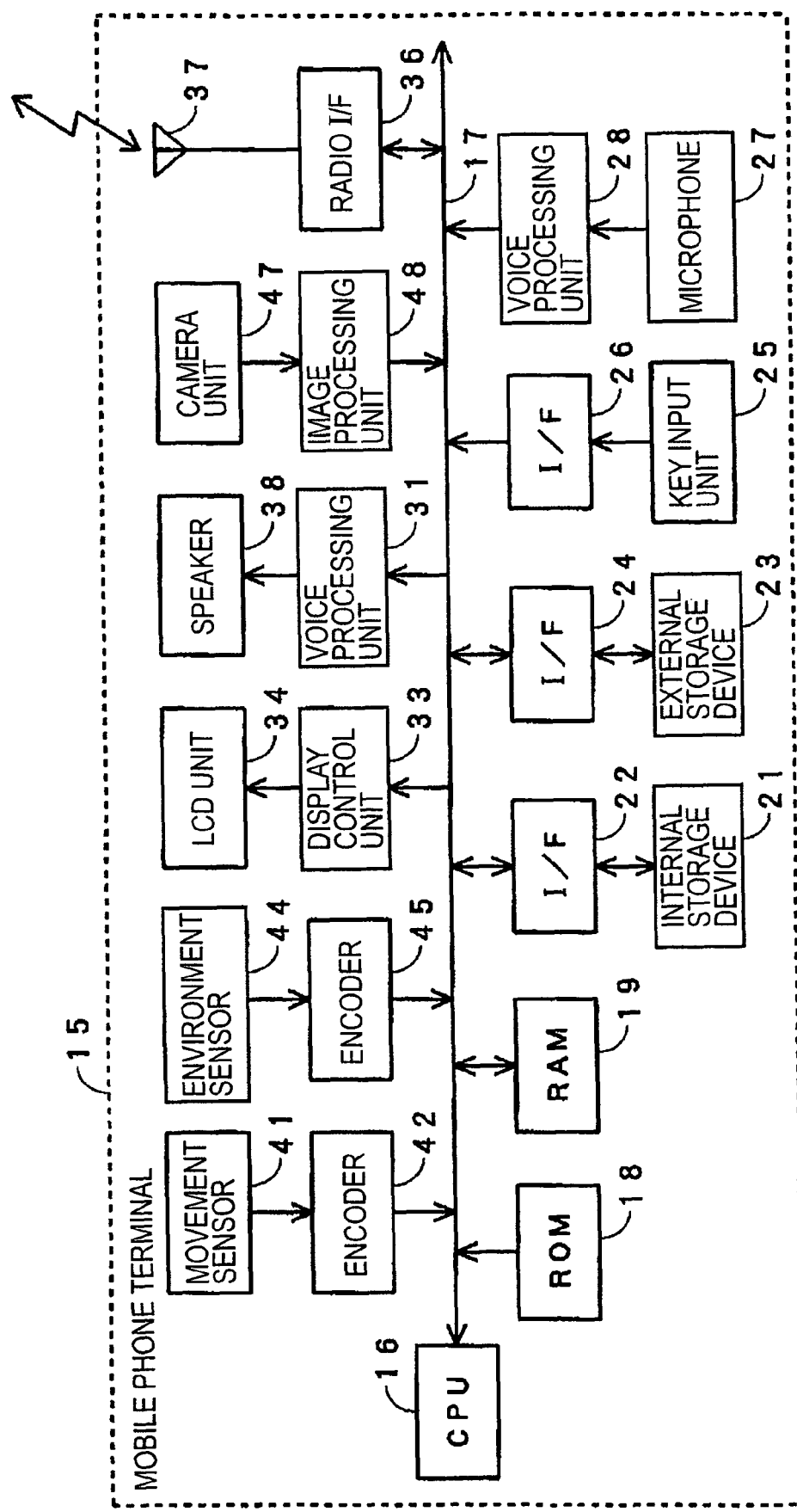
FIG. 23 shows a configuration of a mobile phone terminal in the searching system shown in FIG. 22.
Figure 24:
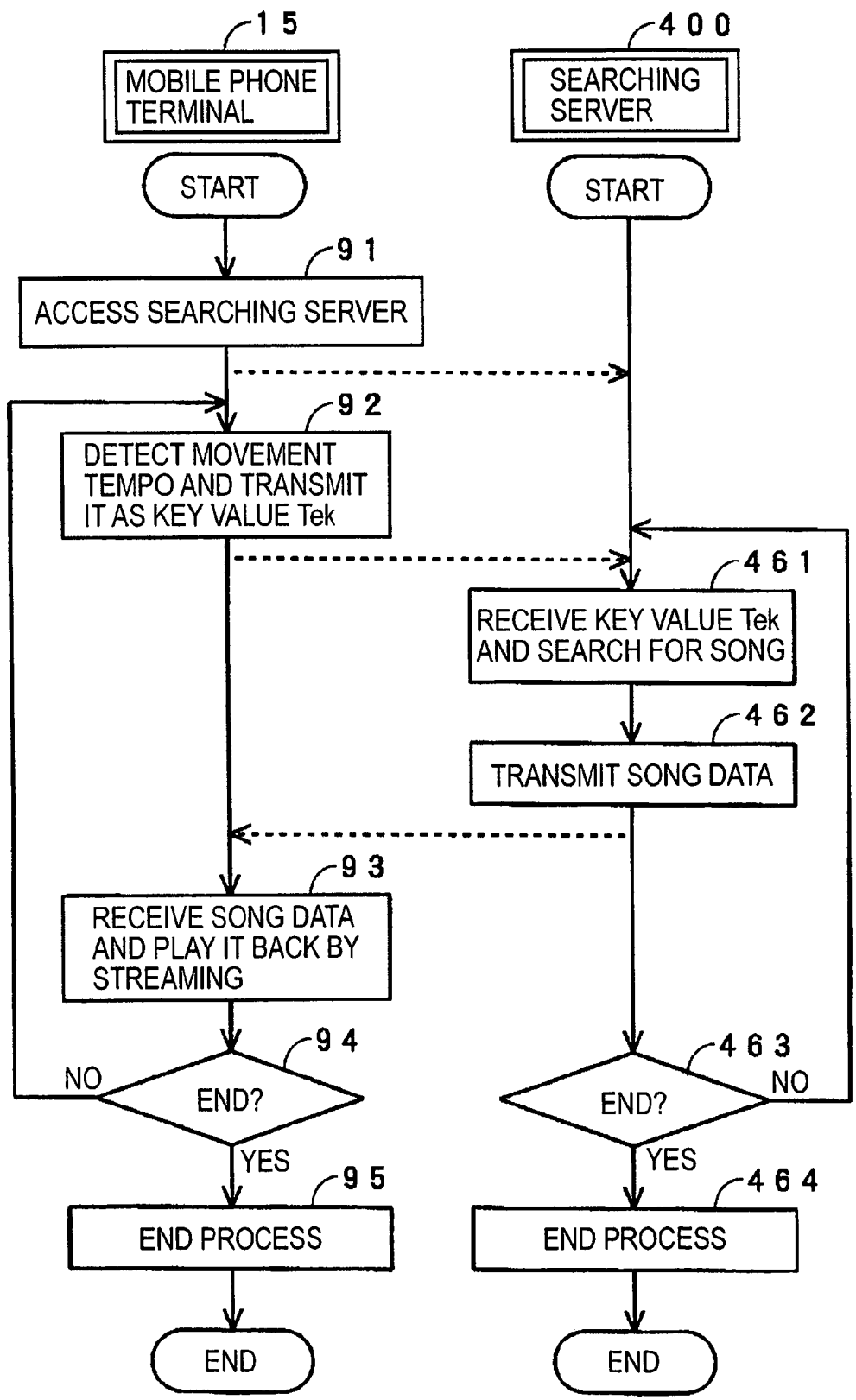
FIG. 24 shows an example of a process routine performed in the searching system shown in FIG. 22.

3. Third Embodiment: FIGS. 22 to 24

As a third embodiment, the case where a song or a song list is searched for in a mobile phone network system is described.

3-1. FIRST EXAMPLE: FIGS. 22 TO 24

FIG. 22 shows an example of a searching system (mobile phone network system) of this case. In this example, a mobile phone terminal 15 on the user side accesses a searching server 400 through a mobile phone network 300 including a base station 310.

As shown in FIG. 23, the mobile phone terminal 15 includes a CPU 16, a bus 17, a ROM 18, a RAM 19, an internal storage device 21, an interface 22, an external storage device 23, an interface 24, a key input unit 25, an interface 26, a microphone 27, a voice processing unit 28, a voice processing unit 31, a speaker 38 as a voice output unit, a display control unit 33, an LCD unit 34, a radio interface 36, an antenna 37, a movement sensor 41, an encoder 42, an environment sensor 44, and an encoder 45, as the user terminal 11 shown in FIG. 1. In addition, a camera unit (image pickup unit) 47 connects to the bus 17 via an image processing unit 48. Among these units, the key input unit 25, the microphone 27 as a transmitter, the speaker 38 as a receiver, the LCD unit 34, and the antenna 37 are shown in FIG. 22.

In this example, a song is searched for or selected in the searching server 400, and song data for streaming playback in the mobile phone terminal 15 is transmitted from the searching server 400 to the mobile phone terminal 15. Thus, the mobile phone terminal 15 does not need the content database 51 shown in FIGS. 2 or 3.

In this example, the searching server 400 searches for a song or a song list, transmits song data of a found song or song data of a song selected from a found song list to the mobile phone terminal 15, and serves as a distribution server. In the searching server 400, a server control unit 410 connects to a content database 420, a content searching unit 430, a radio interface 440, and an antenna 450. In the content database 420, song data and song appendix information of many songs are accumulated and a plurality of song lists are recorded.

That is, in this searching system, the movement information detecting unit 52 and the key information detecting unit 53 shown in FIGS. 2 or 3 are included in the mobile phone terminal 15. The content database 51 shown in FIGS. 2 or 3 and the content searching unit 54 shown in FIG. 2 or the content list searching unit 56 shown in FIG. 3 are provided in the searching server 400 as the content database 420 and the content searching unit 430.

In tempo-based search for a song, the movement information detecting unit 52 of the mobile phone terminal 15 detects movements of a user as movement information, and the key information detecting unit 53 of the mobile phone terminal 15 processes and analyzes the movement information in order to detect a movement tempo of the user as key information (key value Tek), as in the first embodiment.

The mobile phone terminal 15 transmits the detected key information (key value Tek) to the searching server 400 through the mobile phone network 300.

The searching server 400 receives the transmitted key information (key value Tek) and the content searching unit 430 therein searches for a song in the same method as that used in the first embodiment. Note that, popularity of a corresponding song among users of the system on the mobile phone network 300, indicated as category 4 in FIG. 7, is used as score.

The searching server 400 transmits song data of a found song to the mobile phone terminal 15. The mobile phone terminal 15 plays back the found song using the transmitted song data in a streaming method.

The above-described process is performed with a predetermined search period, as in the first embodiment.

FIG. 24 shows an example of a process performed by the mobile phone terminal 15 and the searching server 400 during tempo-based search for a song.

The mobile phone terminal 15 accesses the searching server 400 in step 91. Then, the mobile phone terminal 15 detects a movement tempo of a user and transmits the movement tempo as a key value Tek to the searching server 400 in step 92.

In step 461, the searching server 400 receives the transmitted key value Tek and searches for a song having a song tempo according to the kay value Tek (the movement tempo of the user). Then, in step 462, the searching server 400 transmits song data of the found song to the mobile phone terminal 15.

In step 93, the mobile phone terminal 15 receives the transmitted song data and plays back the song in a streaming method.

Then, in step 94, the mobile phone terminal 15 determines whether the entire process should be ended. If the process should not be ended, the process returns to step 92. If the process should be ended, the process proceeds to step 95, where an end process is performed, and the entire process ends.

Also, the searching server 400 determines in step 463 whether the entire process on the mobile phone terminal 15 should be ended. If the process should not be ended, the process returns to step 461. If the process should be ended, the process proceeds to step 464, where an end process is performed, and the entire process on the mobile phone terminal 15 ends.

In tempo-based search for a song list, the searching server 400 searches for a song list and selects a song from the found song list in step 461 in the same method as that in the first embodiment. Then, in step 462, the searching server 400 transmits song data of the selected song to the mobile phone terminal 15.

In the above-described example, the mobile phone terminal 15 detects a movement tempo of a user as a key value Tek. Alternatively, the searching system may be configured so that the mobile phone terminal 15 transmits movement information of a user to the searching server 400 and that the searching server 400 detects a movement tempo of the user as a key value Tek from the movement information and searches for a song or a song list according to the key value Tek or the movement tempo of the user.

Tempo-based search for a song or a song list has been described above, but the same is applied to rhythm-based search for a song or a song list.

Alternatively, the mobile phone terminal 15 may just download song data transmitted from the searching server 400 at search, and then play back the downloaded song data. Otherwise, the searching server 400 may not transmit song data of a found song or song data of a song selected from a found song list to the mobile phone terminal 15 at search. In that case, ID information of found or selected songs is recorded in the searching server 400 in searching time series or is transmitted from the searching server 400 to the mobile phone terminal 15 so as to be recorded in the mobile phone terminal 15, as in the first example of the second embodiment. Then, the mobile phone terminal 15 plays back the found or selected songs in searching time series by receiving the song data from the searching server 400 or by using the song data recorded in the mobile phone terminal 15.

In this searching system, a song or a song list can be searched for by registering and calling key information by using the above-described methods (5a), (5b), and (5c).

3-2. SECOND EXAMPLE

In the example shown in FIG. 22, a search result or a selection result is transmitted to the mobile phone terminal 15 of the user whose movement is detected. Alternatively, the search result or the selection result may be transmitted to a mobile phone terminal of another user so that the mobile phone terminal of another user can perform streaming playback, as in the second example of the second embodiment.

Figure 25:
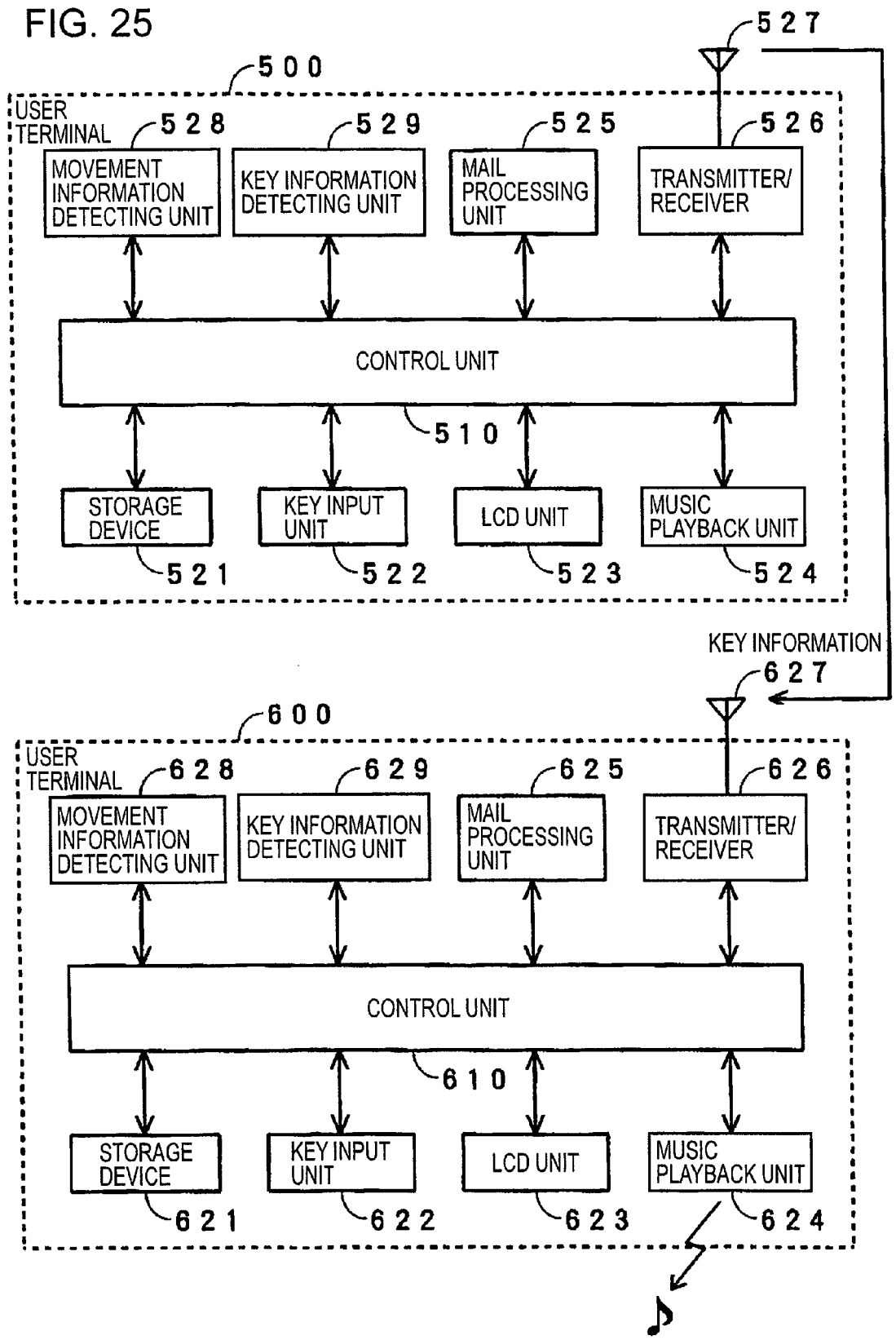
FIG. 25 shows an example of a configuration of a searching system in which user terminals directly communicate with each other in a wireless manner.

4. Fourth Embodiment: FIG. 25

In the second example of the second and third embodiments, a search result or a selection result generated in a searching server on a network is transmitted to a user terminal of a user that is different from a user whose movement is to be detected. However, the above-described key information or movement information may be directly transmitted from a terminal of a user whose movement is to be detected to a terminal of another user, and a song or a song list may be searched for by the terminal of another user.

FIG. 25 shows an example of a searching system of this case. In this example, user terminals 500 and 600 as radio communication terminals are capable of directly communicating with each other in a wireless manner within a limited distance.

The user terminal 500 includes a control unit 510, which connects to a storage device 521, a key input unit 522, an LCD unit 523, a music playback unit 524, a mail processing unit 525, and a transmitter/receiver 526. An antenna 527 connects to the transmitter/receiver 526, and the control unit 510 connects to a movement information detecting unit 528 and a key information detecting unit 529.

The control unit 510 includes a CPU, a ROM, and a RAM and controls each unit of the user terminal 500. When the user terminal 500 serves as a receiving side in search for a song or a song list, the user terminal 500 functions as a song searching unit or a song list searching unit.

The storage device 521 is an incorporated or removable storage device and stores song data, song appendix information, and song lists. The music playback unit 524 plays back songs by using song data stored in the storage device 521 or song data transmitted from the user terminal 600. The mail processing unit 525 processes mails.

The movement information detecting unit 528 detects movements of a user on the user terminal 500 side as movement information, as the movement information detecting unit 52 shown in FIGS. 2 or 3. The key information detecting unit 529 processes and analyzes the movement information obtained by the movement information detecting unit 528 so as to detect a movement tempo or a movement rhythm of the user on the user terminal 500 side as key information, as the key information detecting unit 53 shown in FIGS. 2 or 3.

The user terminal 600 has the same configuration as that of the user terminal 500. The respective elements corresponding to those of the user terminal 500 are denoted by reference numerals of the six hundreds.

In this searching system, assume that the user terminal 500 serves as a transmitting side and the user terminal 600 serves as a receiving side and that tempo-based search for a song or a song list is performed. In this case, the movement information detecting unit 528 of the user terminal 500 detects movements of the user of the user terminal 500 as movement information, and the key information detecting unit 529 of the user terminal 500 processes and analyzes the movement information so as to detect a movement tempo of the user of the user terminal 500 as key information (key value Tek).

The control unit 510 of the user terminal 500 transmits the detected key information (key value Tek) to the user terminal 600 via the transmitter/receiver 526 and the antenna 527.

The user terminal 600 receives the transmitted key information (key value Tek) through the antenna 627 and the transmitter/receiver 626. The control unit 610 searches for a song having a song tempo according to the movement tempo of the user of the user terminal 500 among many songs stored in the storage device 621 or searches for a song list listing songs having a song tempo according to the movement tempo of the user of the user terminal 500 among the plurality of song lists stored in the storage device 621 and selects a song from the found song list, in the same method as that of the first embodiment. Then, the music playback unit 624 plays back the found or selected song.

Accordingly, a song having a song tempo according to the movement tempo of the user of the user terminal 500 is played back in the user terminal 600. The user of the user terminal 600 can know the movement tempo of the user of the user terminal 500 on the basis of the tempo of the played back song and can feel a sense of unity with the user of the user terminal 500.

Conversely, tempo-based search for a song or a song list can be performed while the user terminal 600 being a transmitting side and the user terminal 500 being a receiving side.

Alternatively, in the searching system, the user terminal serving as a transmitting side may transmit movement information that has not been converted to key information to the user terminal serving as a receiving side. The user terminal serving as a receiving side may detect a movement tempo of the user of the user terminal as a transmitting side as key information from the movement information and search for a song or a song list according to the key information.

Likewise, rhythm-based search for a song or a song list can be performed while one of the user terminals 500 and 600 being a transmitting side and the other being a receiving side.

In this embodiment, too, a song or a song list can be searched for by registering and calling key information in the above-described methods (5a), (5b), and (5c) (note that, in that case, the searching server is replaced by a user terminal serving as a receiving side).

5. Another Embodiment: Particularly when the Content is not Song Data

The above-described embodiments are based on the assumption that the content is song data. However, the present invention can also be applied to other types of content.

For example, in animation, change of an entire image or movement of characters in an image has a tempo or rhythm.

Thus, tempo differs in each piece of content: tempo is fast in a piece of content but tempo is slow in another. Also, rhythm differs in each piece of content: a piece of content has a rhythm of a certain pattern but another piece of content has a rhythm of another pattern.

In those cases, content appendix information including tempo and rhythm is attached to each piece of content. Pieces of content whose tempo is within a predetermined range are listed in a content list, and pieces of content whose rhythm has a predetermined pattern are listed in a content list. Accordingly, content or a content list can be searched for in the same way as in the above-described search for a song.

It should be understood by those skilled in the art that various modifications, combinations, sub-combinations and alterations may occur depending on design requirements and other factors insofar as they are within the scope of the appended claims or the equivalents thereof.

What is claimed is:

1. A content searching method comprising:
    operating at least one programmed processor to perform a series of acts, the series of acts being identified by instructions with which the at least one programmed processor is programmed, the series of acts comprising:
        detecting movements of a user to create a user waveform based on the detected movements, the user waveform indicating a rhythm of the movements of the user;
        comparing the user waveform to one or more stored waveforms for predefined movement rhythm patterns to determine key information, the key information identifying a desired rhythm;
        searching for a piece of content having a content rhythm according to the key information among a plurality of pieces of content.

2. The content searching method according to claim 1, wherein the series of acts further comprises:
    transmitting the key information to a searching server through a communication network,
    wherein the searching comprises searching for a piece of content having a content rhythm according to the transmitted key information among the plurality of pieces of content in the searching server.

3. The content searching method according to claim 1, wherein the series of acts further comprises:
    transmitting the user waveform to a searching server through a communication network,
    wherein the searching server determines the key information identifying the desired rhythm of the user as key information from the user waveform, and
    wherein the searching comprises searching for a piece of content having a content rhythm according to the key information among the plurality of pieces of content in the searching server.

4. The content searching method of claim 1, wherein the series of acts further comprises:
    registering the detected key information; and
    calling the registered key information,
    wherein the searching comprises searching for a piece of content having a content rhythm according to the called key information among the plurality of pieces of content.

5. The content searching method according to claim 4, wherein the series of acts further comprises:
    transmitting the registered key information to a searching server through a communication network,
    wherein the searching comprises searching for a piece of content having a content rhythm according to the registered key information among the plurality of pieces of content in the searching server.

6. The content searching method according to claim 4, wherein the series of acts further comprises:
    transmitting the registered key information to a communication terminal,
    wherein the searching comprises searching for a piece of content having a content rhythm according to the registered key information among the plurality of pieces of content in the communication terminal.

7. The content searching method according to claim 1, wherein the series of acts further comprises:
    transmitting the key information to a communication terminal,
    wherein the searching comprises searching for a piece of content having a content rhythm according to the transmitted key information among the plurality of pieces of content in the communication terminal.

8. The content searching method according to claim 1, wherein the series of acts further comprises:
    transmitting the user waveform to a communication terminal,
    wherein the communication terminal determines the key information identifying the desired rhythm of the user as key information from the user waveform, and
    wherein the searching comprises searching for a piece of content having a content rhythm according to the key information among the plurality of pieces of content in the communication terminal.

9. The content searching method of claim 1, wherein the series of acts further comprises detecting a movement tempo of the user from the movement information, and wherein searching for a piece of content comprises searching for a piece of content having a content tempo according to the movement tempo.

10. The content searching method of claim 1, wherein the series of acts further comprises detecting at least one environmental condition, and wherein searching for a piece of content comprises searching for a piece of content having environment information according to the environmental condition.

11. The content searching method of claim 10, wherein the series of acts further comprises determining, from the at least one environmental conditions, one or more environmental characteristics from a group consisting of a time of year, a time of day, temperature, whether the environment is indoor or outdoor, and whether the environment is a geographic location having at least one particular geographic feature.

12. The content searching method of claim 11, wherein the environment information of the piece of content is a word or phrase associated with the piece of content, and wherein searching for a piece of content having the environment information comprises searching for a piece of content having a word or phrase that matches a word or phrase describing the one or more environmental characteristics.

13. A content list searching method comprising:
    operating at least one programmed processor to perform a series of acts, the series of acts being identified by instructions with which the at least one programmed processor is programmed, the series of acts comprising:
        detecting movements of a user to create a user waveform based on the detected movements, the user waveform indicating a rhythm of the movements of the user;
        comparing the user waveform to one or more stored waveforms for predefined movement rhythm patterns to determine key information, the key information identifying a desired rhythm;

searching for a content list listing pieces of content having a content rhythm according to the key information among a plurality of content lists.

14. The content list searching method according to claim 13, wherein the series of acts further comprises:
transmitting the key information to a searching server through a communication network,
wherein the searching comprises searching for a content list listing pieces of content having a content rhythm according to the transmitted key information among the plurality of content lists in the searching server.

15. The content list searching method according to claim 13, wherein the series of acts further comprises:
transmitting the user waveform to a searching server through a communication network,
wherein the searching server determines the key information identifying the desired rhythm of the user as key information from the user waveform, and
wherein the searching comprises searching for a content list listing pieces of content having a content rhythm according to the key information among the plurality of content lists in the searching server.

16. The content list searching method of claim 13, wherein the series of acts further comprises:
registering the detected key information; and
calling the registered key information,
wherein the searching comprises searching for a content list listing pieces of content having a content rhythm according to the called key information among the plurality of content lists.

17. The content list searching method according to claim 16, wherein the series of acts further comprises:
transmitting the registered key information to a searching server through a communication network,
wherein the searching comprises searching for a content list listing pieces of content having a content rhythm according to the registered key information among the plurality of content lists in the searching server.

18. The content list searching method according to claim 16, wherein the series of acts further comprises:
transmitting the registered key information to a communication terminal,
wherein the searching comprises searching for a content list listing pieces of content having a content rhythm according to the registered key information among the plurality of content lists in the communication terminal.

19. The content list searching method according to claim 13, wherein the series of acts further comprises:
transmitting the key information to a communication terminal,
wherein the searching comprises searching for a content list listing pieces of content having a content rhythm according to the transmitted key information among the plurality of content lists in the communication terminal.

20. The content list searching method according to claim 13, wherein the series of acts further comprises:
transmitting the user waveform to a communication terminal,
wherein the communication terminal determines the key information identifying the desired rhythm of the user as key information from the user waveform, and
wherein the searching comprises searching for a content list listing pieces of content having a content rhythm according to the key information among the plurality of content lists in the communication terminal.

21. The content list searching method of claim 13, wherein the series of acts further comprises detecting a movement tempo of the user from the movement information, and wherein searching for a content list comprises searching for a content list listing pieces of content having a content tempo according to the movement tempo.

22. A content searching apparatus comprising:
a storage device for storing and holding content data and/or content appendix information of a plurality of pieces of content;
detecting means for detecting movements of a user to create a user waveform based on the detected movements, the user waveform indicating a rhythm of the movements of the user;
comparing means for comparing the user waveform to one or more stored waveforms for predefined movement rhythm patterns to determine key information, the key information identifying a desired rhythm; and
searching means for searching for a piece of content having a content rhythm according to the key information among the plurality of pieces of content whose content data and/or content appendix information are stored in the storage device.

23. The content searching apparatus of claim 22, wherein the series of acts further comprises:
control means for registering the detected key information and calling the registered key information,
wherein the searching means searches for a piece of content having a content rhythm according to the key information called by the control means among the plurality of pieces of content whose content data and/or content appendix information are stored in the storage device.

24. The content searching apparatus of claim 22, wherein the detecting means detects a movement tempo of the user from the movement information, and wherein the searching means searches for a piece of content having a content tempo according to the movement tempo.

25. The content list searching apparatus of claim 22, wherein the detecting means detects a movement tempo of the user from the movement information, and wherein the searching means searches for a content list listing pieces of content having a content tempo according to the movement tempo.

26. A content list searching apparatus comprising:
a storage device for storing and holding a plurality of content lists, each listing pieces of content whose content patterns are the same or similar;
detecting means for detecting movements of a user to create a user waveform based on the detected movements, the user waveform indicating a rhythm of the movements of the user;
comparing means for comparing the user waveform to one or more stored waveforms for predefined movement rhythm patterns to determine key information, the key information identifying a desired rhythm; and
searching means for searching for a content list listing pieces of content having a content rhythm according to the key information among the plurality of content lists stored in the storage device.

27. The content list searching apparatus of claim 26, wherein the series of acts further comprises:
control means for registering the detected key information and calling the registered key information,
wherein the searching means searches for a content list listing pieces of content having a content rhythm according to the key information called by the control means among the plurality of content lists stored in the storage device 28. A searching server accessed by a user terminal through a communication network, the searching server comprising:

a data store storing content data and/or content appendix information of a plurality of pieces of content and registered key information related to movements of a user and storing one or more stored waveforms for predefined movement rhythm patterns;

comparing means for comparing a user waveform, transmitted from the user terminal to the searching server, to the one or more stored waveforms for predefined movement rhythm patterns to determine key information, the key information identifying a desired rhythm; and searching means for searching for a piece of content having a content rhythm according to the key information among the plurality of pieces of content whose content data and/or content appendix information are stored in the data store.

29. The searching server according to claim 28, further comprising:
detecting means for detecting a movement of the user to create the user waveform based on the detected movement, the user waveform indicating a rhythm of the movements of the user.

30. The searching server of claim 28, wherein the information further indicates a movement tempo of the user, and the searching means searches for a piece of content having a content tempo according to the movement tempo.

31. A searching server accessed by a user terminal through a communication network, the searching server comprising:
a data store storing a plurality of content lists, each listing pieces of content whose content patterns are the same or similar, and registered key information related to movements of a user and storing one or more stored waveforms for predefined movement rhythm patterns;

comparing means for comparing a user waveform, transmitted from the user terminal to the searching server, to the one or more stored waveforms for predefined movement rhythm patterns to determine key information, the key information identifying a desired rhythm; and searching means for searching for a content list listing pieces of content having a content rhythm according to the key information among the plurality of content lists stored in the data store.

32. The searching server according to claim 31, further comprising:
detecting means for detecting a movement of the user to create the user waveform based on the detected movement, the user waveform indicating a rhythm of the movements of the user.

33. The searching server of claim 31, wherein the information further indicates a movement tempo of the user, and the searching means searches for a content list listing pieces of content having a content tempo according to the movement tempo.

34. A recording medium storing a content searching program allowing a computer to function as:
means for detecting movements of a user to create a user waveform based on the detected movements, the user waveform indicating a rhythm of the movements of the user;

means for comparing the user waveform to one or more stored waveforms for predefined movement rhythm patterns to determine key information, the key information identifying a desired rhythm; and means for searching for a piece of content having a content rhythm according to the key information among a plurality of pieces of content.

35. The recording medium of claim 34, wherein the means for detecting further detects a movement tempo of the user, and the means for searching searches for a piece of content having a content tempo according to the movement tempo.

36. A recording medium storing a content list searching program allowing a computer to function as:
means for detecting movements of a user to create a user waveform based on the detected movements, the user waveform indicating a rhythm of the movements of the user;

means for comparing the user waveform to one or more stored waveforms for predefined movement rhythm pattern to determine key information, the key information identifying a desired rhythm; and means for searching for a content list listing pieces of content having a content rhythm according to the key information among a plurality of content lists.

37. The recording medium of claim 36, wherein the means for detecting further detects a movement tempo of the user, and the means for searching searches for a content list listing pieces of content having a content tempo according to the movement tempo.

38. A content searching apparatus comprising:
a storage device configured to store and hold content data and/or content appendix information of a plurality of pieces of content;

a detecting unit configured to detect movements of a user to create a user waveform based on the detected movements, the user waveform indicating a rhythm of the movements of the user;

a comparing unit configured to compare the user waveform to one or more stored waveforms for predefined movement rhythm to determine key information, the key information identifying a desired rhythm;

a searching unit configured to search for a piece of content having a content rhythm according to the key information among the plurality of pieces of content whose content data and/or content appendix information are stored in the storage device.

39. The content searching apparatus of claim 38, wherein the detecting unit is further configured to detect a movement tempo from the movement information, and the searching unit is further configured to search for a piece of content having a content tempo according to the movement tempo.

40. A content list searching apparatus comprising:
a storage device configured to store and hold a plurality of content lists, each listing pieces of content whose content patterns are the same or similar;

a detecting unit configured to detect movements of a user to create a user waveform based on the detected movements, the user waveform indicating a rhythm of the movements of the user;

a comparing unit configured to compare the user waveform to one or more stored waveforms for predefined movement rhythm patterns to determine key information, the key information identifying a desired rhythm; and a searching unit configured to search for a content list listing pieces of content having a content rhythm according to the key information among the plurality of content lists stored in the storage device.

41. The content list searching apparatus of claim 40, wherein the detecting unit is further configured to detect a movement tempo from the movement information, and the searching unit is further configured to search for a content list listing pieces of content having a content tempo according to the movement tempo.

42. A searching server accessed by a user terminal through a communication network, the searching server comprising:

a data store configured to store content data and/or content appendix information of a plurality of pieces of content and storing one or more stored waveforms for predefined movement rhythm patterns;

a comparing unit for comparing a user waveform, transmitted from the user terminal to the searching server, to the one or more stored waveforms for predefined movement rhythm patterns to determine key information, the key information identifying a desired rhythm; and a searching unit configured to search for a piece of content having a content rhythm according to information among the plurality of pieces of content whose content data and/or content appendix information are stored in the data store.

43. The searching server of claim 42, wherein the information further indicates a movement tempo of the user, and the searching unit is further configured to search for a piece of content having a content tempo according to the movement tempo.

44. A searching server accessed by a user terminal through a communication network, the searching server comprising:

a data store configured to store a plurality of content lists, each listing pieces of content whose content rhythm patterns are the same or similar and storing one or more stored waveforms for predefined movement rhythm patterns;

a comparing unit for comparing a user waveform, transmitted from the user terminal to the searching server, to the one or more stored waveforms for predefined movement rhythm patterns to determine key information, the key information identifying a desired rhythm; and a searching unit configured to search for a content list listing pieces of content having a content according to information indicating a movement rhythm pattern of a user transmitted from the user terminal among the plurality of content lists stored in the data store.

45. The searching server of claim 44, wherein the information further indicates a movement tempo of the user, and the searching unit is further configured to search for a content list listing pieces of content having a content tempo according to the movement tempo.

* * * * *